(12) United States Patent
Umeda et al.

(10) Patent No.: US 7,116,826 B2
(45) Date of Patent: Oct. 3, 2006

(54) EMBEDDING WITH ERROR-CORRECTION ENCODING

(75) Inventors: Kiyoshi Umeda, Kanagawa (JP); Nobutaka Miyake, Kanagawa (JP); Minoru Kusakabe, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 445 days.

(21) Appl. No.: 10/170,358

(22) Filed: Jun. 14, 2002

(65) Prior Publication Data

US 2002/0191856 A1   Dec. 19, 2002

(30) Foreign Application Priority Data

Jun. 15, 2001 (JP) ............................. 2001-182459
Sep. 20, 2001 (JP) ............................. 2001-287554

(51) Int. Cl.
  *G06K 9/36* (2006.01)
(52) U.S. Cl. ..................................... 382/232; 358/425
(58) Field of Classification Search ............... 382/232, 382/234, 252, 237, 238, 239, 242, 245, 246, 382/247, 248, 249, 251; 358/3.28, 425; 714/758, 714/759, 774, 776, 701
See application file for complete search history.

(56) References Cited

U.S. PATENT DOCUMENTS

| 5,652,626 | A | | 7/1997 | Kawakami et al. | ......... 348/463 |
|---|---|---|---|---|---|
| 5,761,686 | A | * | 6/1998 | Bloomberg | .................. 715/529 |
| 5,818,970 | A | | 10/1998 | Ishikawa et al. | ............. 382/248 |
| 6,088,489 | A | | 7/2000 | Miyake | ...................... 382/299 |
| 6,298,460 | B1 | * | 10/2001 | Sasaki et al. | ................ 714/752 |
| 6,553,127 | B1 | * | 4/2003 | Kurowski | .................... 382/100 |
| 6,614,914 | B1 | * | 9/2003 | Rhoads et al. | .............. 382/100 |
| 6,674,899 | B1 | * | 1/2004 | Nagarajan et al. | .......... 382/168 |
| 6,920,150 | B1 | * | 7/2005 | Pauls et al. | .................. 370/465 |

FOREIGN PATENT DOCUMENTS

| EP | 1102474 A | 5/2001 |
|---|---|---|
| JP | 10-171912 | 6/1998 |
| JP | 2001-024877 | 1/2001 |
| JP | 2001-148778 A | 5/2001 |

* cited by examiner

*Primary Examiner*—Bhavesh M. Mehta
*Assistant Examiner*—Dennis Rosario
(74) *Attorney, Agent, or Firm*—Fitzpatrick, Cella, Harper & Scinto

(57) ABSTRACT

A maximum embedding amount can be ensured depending on information to be embedded, by determining an error-correction capability in correspondence with the characteristic of embedded information. For this purpose, upon multiplexing additional information, the additional information is error-correction encoded. At this time, if the additional information is a BMP file, a WAV file or the like, coding is performed with a low error-correction capability since image reproduction can be made without serious problem even if the error-correction capability is low. The error-correction capability is determined by an error-correction parameter determination unit 205 based on an extension of the additional information.

21 Claims, 35 Drawing Sheets

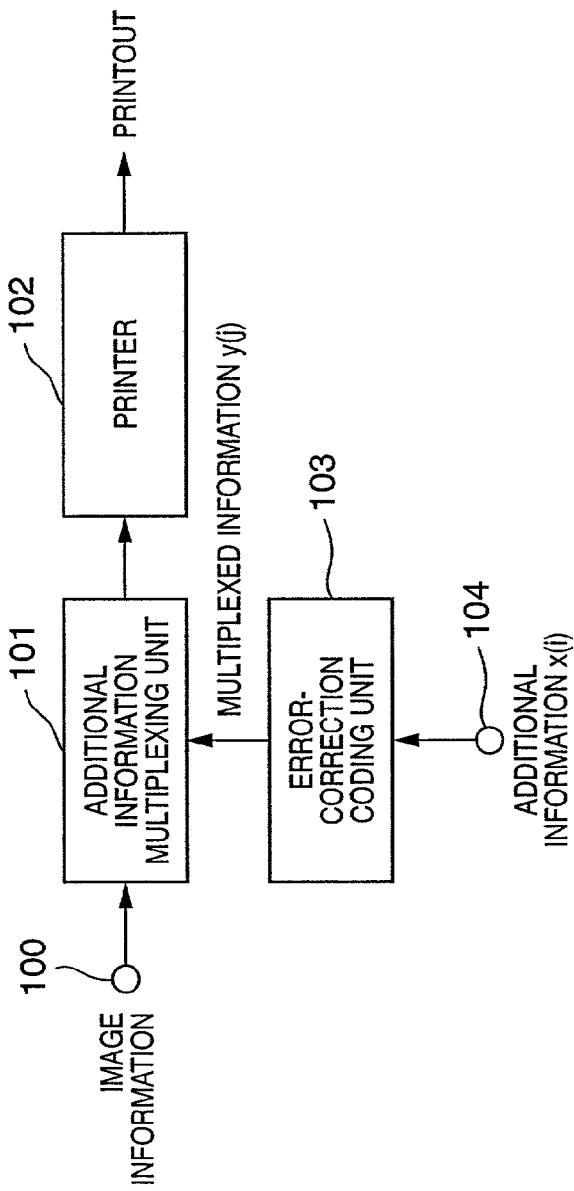
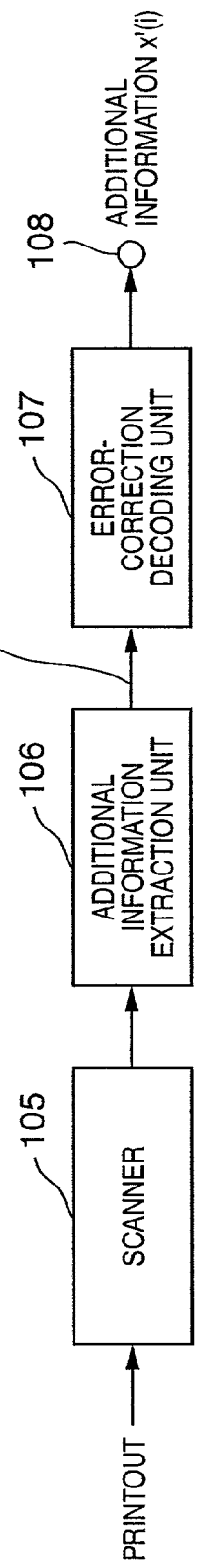

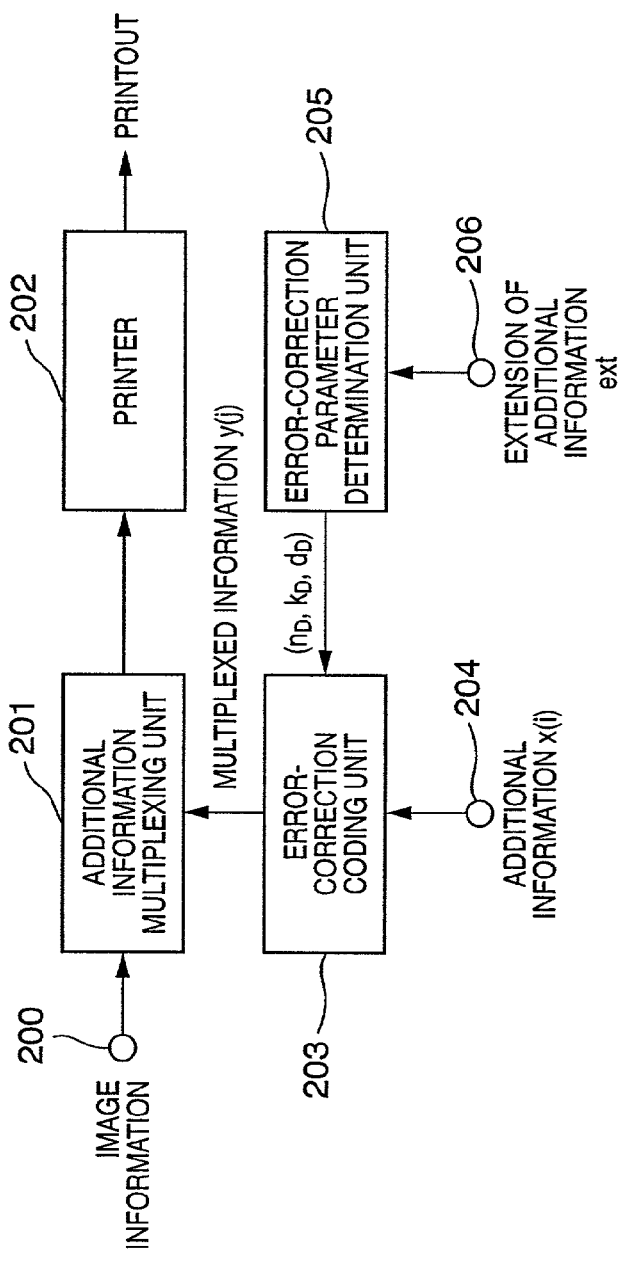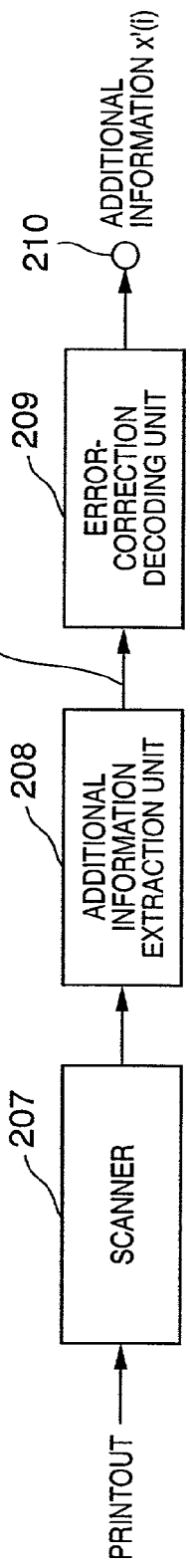

FIG. 5

| i | Ext[i] | $(n_D^i, k_D^i, d_D^i)$ |
|---|--------|-------------------------|
| 0 | BMP | (255, 215, 11) |
| 1 | WAV | (255, 179, 21) |
| ... | ... | ... |
| — | — | (255, 133, 33) |

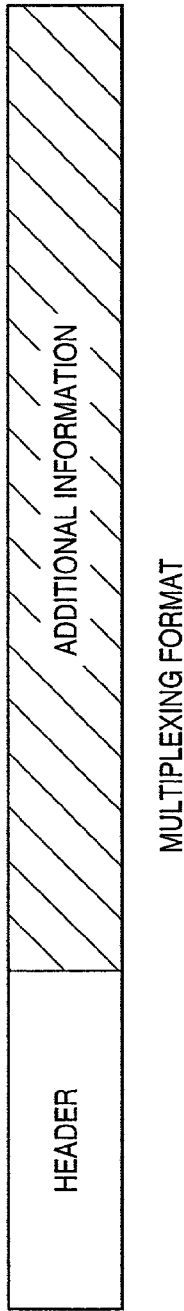
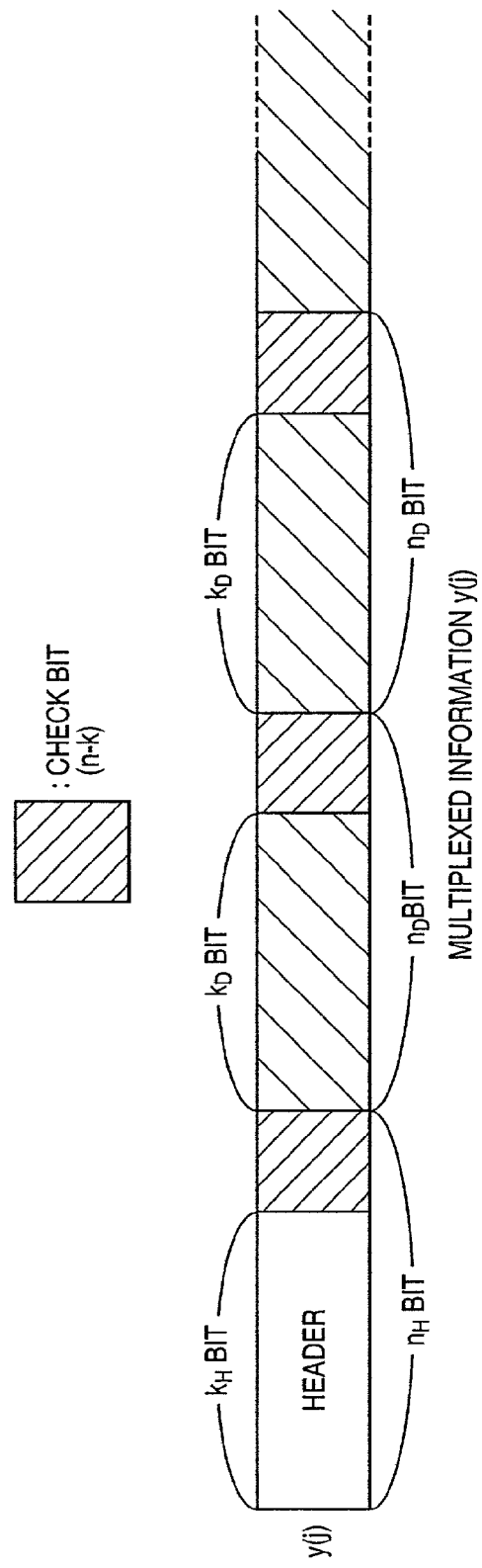
FIG. 8A
FIG. 8B

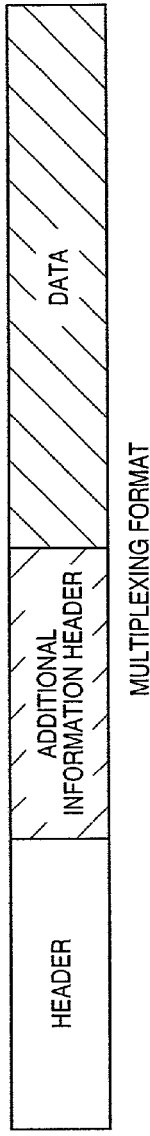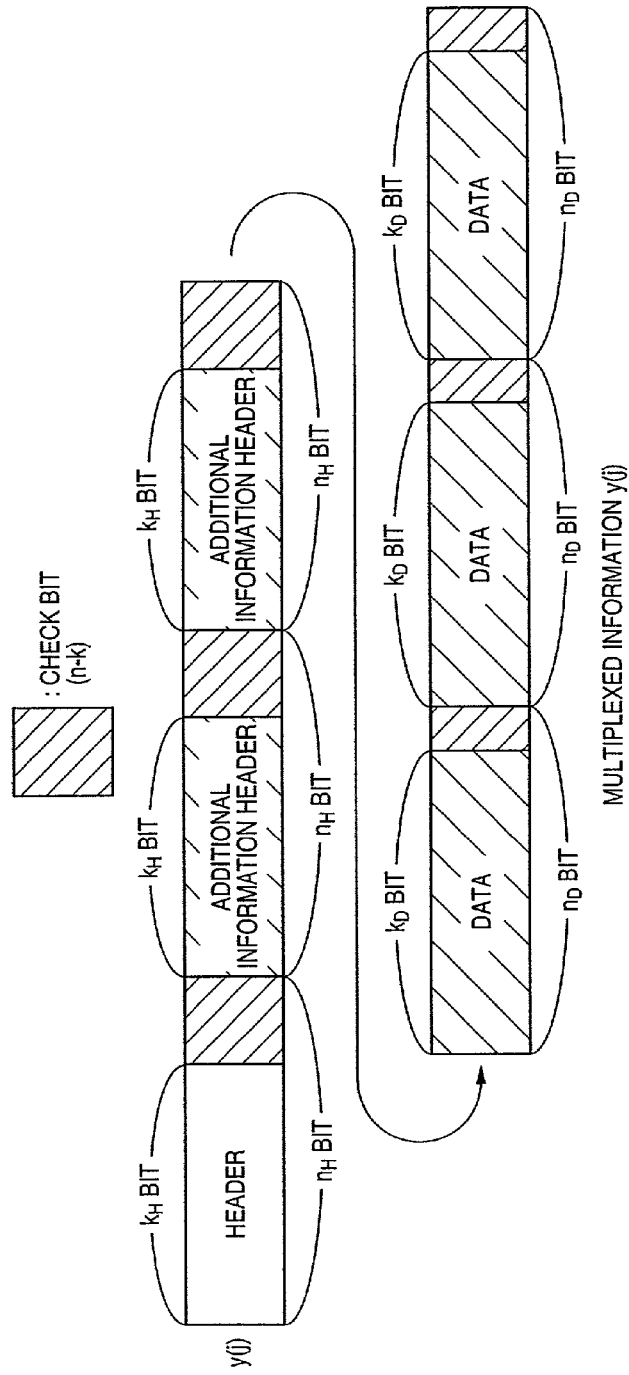

FIG. 19

| m | Name[m] | $(n_{D1}{}^m, k_{D1}{}^m, d_{D1}{}^m...)$ |
|---|---|---|
| 0 | PrinterA | (255, 215, 11) |
| 1 | PrinterB | (255, 179, 21) |
| 2 | PrinterC | (255, 155, 27) |
| ... | ... | ... |
| M | — | (255, 133, 33) |

FIG. 26

| m | Name[m] | $(n_{D1}^m, k_{D1}^m, d_{D1}^m ...)$ |
|---|---|---|
| 0 | PrinterA, 600dpi | (255, 215, 11) |
| 1 | PrinterB, 600dpi | (255, 179, 21) |
| 2 | PrinterA, 300dpi | (255, 155, 27) |
| 3 | PrinterB, 300dpi | (255, 133, 33) |
| ... | ... | ... |
| M | — | (255, 133, 33) |

FIG. 29

| m | Q[m] | $(n_{D2}{}^m, k_{D2}{}^m, d_{D2}{}^m, \ldots)$ |
|---|---|---|
| 0 | MAXIMUM QUALITY | (255, 215, 11) |
| 1 | HIGH QUALITY | (255, 179, 21) |
| 2 | NORMAL | (255, 155, 27) |
| 3 | HIGH SPEED | (255, 133, 33) |

FIG. 34

| m | P[m] | $(n_{D3}{}^m, k_{D3}{}^m, d_{D3}{}^m \cdots)$ |
|---|------|------------------------------------------------|
| 0 | 0    | (255, 215, 11) |
| 1 | 1    | (255, 179, 21) |
| 2 | 2    | (255, 155, 27) |

EMBEDDING WITH ERROR-CORRECTION ENCODING

FIELD OF THE INVENTION

The present invention relates to image processing apparatus and method, and computer program and storage medium.

BACKGROUND OF THE INVENTION

Conventionally, the study of embedding of particular information in image information has grown for the purpose of prevention of unauthorized is duplication and falsification. Such technique is called digital watermarking. For example, a photograph, a picture or the like is electronified, and additional information such as the author's name, permission/prohibition of use and the like is embedded in the image information. A technique which is on its way to becoming standardized in recent years is embedding additional information in original image information in a manner such that the additional information is visually unrecognizable, and delivering the image information via a network such as the Internet.

Further, also being studied is a technique of specifying additional information such as type of printer or its model number from paper on which the image is printed. These techniques are employed for prevention of unauthorized duplication of bank notes, stamps, negotiable instruments and the like, with wide use of high-quality image formation apparatus such as a copier and a printer.

For example, U.S. Pat. No. 5,652,626 discloses a technique of embedding additional information in a high frequency area of visually low-sensible chrominance component and chromaticness component of image.

However, in the above-described conventional art, it is very difficult to embed a large amount of information such as audio information in an image such that the embedded information is not conspicuous when print-outputted.

Accordingly, as means of solution of the above problem, the assignee of the present application has proposed in Japanese Published Unexamined Patent Application No. 2001-148778 (corresponding to U.S. patent application Ser. No. 09/711,956 filed on Nov. 15, 2000) to utilize texture caused by the error diffusion method to artificially generate a combination of quantized values which does not occur in general pseudo halftone processing and embed the generated code in image information. According to this technique, as the shape of texture merely microspically changes, in comparison with the original image, the image quality is not visually degraded. Further, different types of signals can be multiplexed extremely easily by changing a quantization threshold value in the error diffusion method.

Next, a description will be made about an image processing system having an image processing apparatus which embeds additional information in image information and print-outputs an image, and an image processing apparatus which extracts the additional information embedded in a printed image, proposed by the assignee of the present application. FIG. 1A is a block diagram showing the construction of the image processing apparatus proposed by the assignee of the present application which embeds additional information in image information and print-outputs an image.

In the figure, reference numerals 100 and 104 both denote input terminals. Multivalue image information is inputted from the input terminal 100, and additional information to be embedded in the image information is inputted from the input terminal 104. The additional information is different information from the image information inputted from the input terminal 100, e.g., audio information and copyright information regarding the image inputted from the input terminal 100. The additional information is subjected to coding processing for error correction by an error-correction coding unit 103. In the error-correction coding, any type of code e.g. BCH (Bose-Chaudhuri-Hocquenghem) code or Reed-Solomon code may be used. The multiplexed information resulted from the error-correction coding is inputted into an additional information multiplexing unit 101. The additional information multiplexing unit 101 embeds the additional information in the image information in a manner such that the additional information is visually indiscriminable. Further, the additional information multiplexing unit 101 quantizes the input multivalue image information. Numeral 102 denotes a printer which outputs information generated by the additional information multiplexing unit 101 by a printer engine. The printer 102 may be a printer such as an ink-jet printer, a laser printer or the like which realizes tonality representation by using the pseudo halftone processing.

FIG. 1B is a block diagram showing the construction of the image processing apparatus proposed by the assignee of the present application which extracts additional information from a printed image.

Information on a printout is read by using a scanner 105, and additional information embedded in the printout is extracted by an additional information extraction unit 106. The extracted additional information is subjected to error-correction decoding processing by an error-correction decoding unit 107, and outputted from an output terminal 108. Note that as the algorithms regarding multiplexing and decoding are described in Japanese Published Unexamined Patent Application No. 2001-148778 (corresponding to U.S. patent application Ser. No. 09/711,956 filed on Nov. 15, 2000), they are omitted here.

By application of the above method, in comparison with the conventional art, a large amount of information having an arbitrary content can be embedded in an image without degrading the image quality.

However, in the above method, the error-correction coding processing having the same correction capability is performed regardless of the type of printer to print output an image, the resolution upon printing, the print quality arbitrarily set by a user, the characteristic of multiplexed image and the like. Generally, the precision of reproduction of embedded additional information $x(j)$ from a printed image read by the image scanner 105 depends on errors upon reading by the additional information extraction unit 106. The error rate depends on the above-described conditions.

That is, in use of high-performance printer capable of printing an image of quality equivalent to a photograph, as it has a high print precision, the error rate at the additional information extraction unit 106 is low. However, in use of printer which cannot print an image of such high quality, the error rate at the additional information extraction unit 106 is higher. Further, the error rate increases in proportion to the print quality set by the user.

Further, the error rate changes depending on the character of image to be multiplexed. For example, in a case where an image has many high density portions upon printing, blur due to a large amount of ink or toner often causes reading error. On the other hand, if an image has many low density portions, the amount of ink or toner is too small, which often causes reading error due to insufficient representation of periodicity of texture indicating additional information.

In this manner, in the conventional art, the image processing is not performed with distinction between a case where the error rate is high and a case where the error rate is low. That is, the amount of information is increased by reducing the amount of check bits even if it is expected that the error rate is low. Any method of changing the amount of check bits by various conditions has not been proposed.

Further, as uniformly same error-correction coding processing has been performed regardless of characteristic of additional information, the processing is susceptible to improvement. For example, some additional information disables reproduction of the entire information if the additional information includes even 1-bit error information, on the other hand, some additional information has redundancy and does not seriously disturb reproduction of additional information even if the information includes bit error to some degree. As an example of the former information, information of image compression format JPEG can be given, and as an example of the latter information, a BMP file (a file where pixel-unit data are simply rearranged without compression), a WAV file (a file where sound sampled data are simply rearranged) and the like can be given.

That is, regarding a BMP file, a WAVE file and the like, even if more or less bit errors are included, no problem occurs upon representation (reproduction). In other words, in a case where such information is embedded, the intensity for error correction may be low.

SUMMARY OF THE INVENTION

The present invention has been made in consideration of the above situation, and has its object to provide an image processing apparatus, coding apparatus and method, computer program and storage medium which ensure a maximum embedding amount depending on embedded information by determining an error correction capability in correspondence with the characteristic of embedded information.

Further, another object of the present invention is to provide image processing apparatus and method, computer program and storage medium which optimize the relation between the amount of addable information as additional information and the amount of check bits for error correction.

To attain the above objects, the image processing apparatus according to the present invention has the following construction. That is, provided is an image processing apparatus which multiplexes additional information, different from image information, in the image information, comprising: detection means for detecting a characteristic of the additional information; determination means for determining error-correction capability upon error-correction on the additional information based on the result of detection by the detection means; and coding control means for encoding the additional information with the error-correction capability determined by the determination means, wherein the coded additional information obtained under the control of the coding control means is multiplexed in the image information.

Other features and advantages of the present invention will be apparent from the following description taken in conjunction with the accompanying drawings, in which like reference characters designate the same name or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIGS. 1A and 1B are block diagrams of general multiplexing device and decoding device;

FIGS. 2A and 2B are block diagrams of multiplexing device and decoding device according to a first embodiment of the present invention;

FIG. 5 is a table showing the relation between file type and error-correction parameter according to the first embodiment;

FIGS. 8A and 8B are schematic diagrams showing a multiplexing format according to the first embodiment;

FIGS. 12A and 12B are schematic diagrams showing the multiplexing format;

FIG. 19 is a table showing a list stored in a secondary storage device 1035 in a control device 1030 for multiplexing or decoding;

FIG. 26 is a table showing a list of parameter PntParam as combinations of printer model name and print resolution;

FIG. 29 is a table of list of error-correction parameter optimized for respective print modes;

FIG. 34 is a table showing a list or error-correction parameters to reduce the amount of addable information and increase correction capability in accordance with increase in parameter Property.

DETAILED DESCRIPTION OF THE PREFERRED EMBODIMENTS

Figure 3:
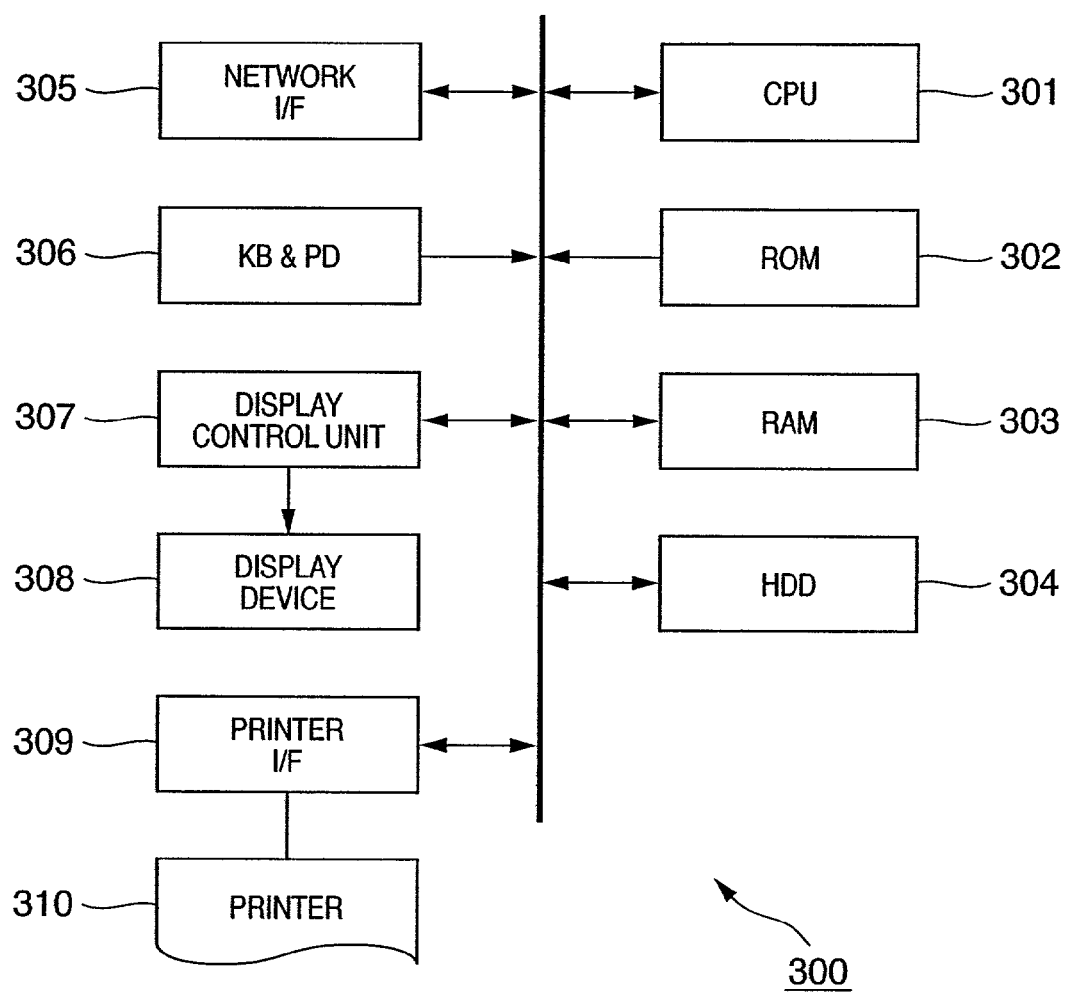
FIG. 3 is a block diagram showing a particular construction of an apparatus to which the first embodiment is applied.

Hereinbelow, preferred embodiments of the present invention will now be described in detail in accordance with the accompanying drawings.

Note that an image processing apparatus of the embodiments is applied to an application program which operates on a general information processing apparatus such as a personal computer. Further, though any OS (Operation System) may be used, Windows provided by Microsoft Corporation is employed here.

<First Embodiment>

FIGS. 2A and 2B are block diagrams showing the construction of an image processing system according to a first embodiment. As shown in the figures, the image processing system has an image processing apparatus which embeds additional information in image information and performs printing and an image processing apparatus which inputs a printed image by an image scanner and extracts additional information.

In the figure, reference numerals 200 and 204 both denote input terminals. Multivalue image information is inputted from the input terminal 200, and necessary "size" bit information to be embedded as additional information in the image information is inputted from the input terminal 204. The additional information is different information from the image information inputted from the input terminal 200, i.e., audio information and copyright information regarding the image inputted from the input terminal 200. The additional information is inputted into an error-correction coding unit 203, and subjected to coding processing for error correction.

Various error correcting code have been proposed. As representative codes, Reed-Solomon code, BCH code, Fire code, Peterson code can be given. Any of these codes may be employed as the error correcting code, however, the present embodiment uses the BCH code which is employed in various systems for its simple structure and high coding rate. Note that as the algorithm of the BCH coding has already been described in various documents, it will be omitted in the present specification.

Further, in the present embodiment, the BCH code is represented as BCH(n,k,d) which means that the code length of the BCH code is n bits, k bits of the code length n bits are information bits, remaining n−k bits are check bits, and errors up to t=[d/2] bits can be corrected by this structure. Note that the square brackets [ ] mean a maximum integer not exceeding itself. The error-correction coding unit 203 adds the check bits to input additional information x(i), and as a result, outputs multiplexed information y(j) (j>size).

An error-correction parameter determination unit 205 determines a parameter $(n_D, K_D, d_D)$ necessary in the error-correction coding unit 203. The error-correction parameter determination unit 205 inputs an extension ext (generally 3 or 4 characters) attached to a file name of additional information, and determines the parameter $(n_D, K_D, d_D)$ in accordance with the input extension. Note that the parameter $(n_D, K_D, d_D)$ is an error-correction parameter for data. As described later, error-correction coding with comparatively high correction capability is performed on a header of multiplexing format by using a predetermined parameter $(n_H, K_H, d_H)$ regardless of type of data.

Numeral 201 denotes an additional information multiplexing unit which embeds multiplexed information y(i) in image information in a manner such that the additional information is visually unrecognizable. The additional information multiplexing unit performs quantization on input multivalue image information as well as multiplexing on additional information. Numeral 202 denotes a printer which outputs the information generated by the additional information multiplexing unit 201 by a printer engine. Any type of printer such as ink-jet printer or laser printer may be employed as long as it realizes tonality representation by using the pseudo halftone processing.

Information on the printout is read by an optical reading device 207 such as a scanner, then the additional information embedded in the printout is extracted by an additional information depravation unit 208, and the read multiplexed information y'(i) is inputted into an error-correction decoding unit 209. The error-correction decoding unit performs error-correction processing and outputs the resulted additional information x'(i) to an output terminal 210.

In a case where the above processing is realized on a general information processing apparatus, most of the processing is performed by a program executed by a processor. FIG. 3 shows an example of particular apparatus construction.

In the figure, numeral 301 denotes a CPU which controls the entire apparatus; 302, a ROM in which a boot program and a BIOS are stored; 303, a RAM used as a work area for the CPU 301; 304, a hard disk device as a secondary storage device in which an OS, an application program for digital watermarking, image files and the like are stored; 305, a network interface for connection to a network (including the Internet); 306, a keyboard or mouse; 307, a display control unit having an internal display memory (not shown) which performs write-in (drawing) processing on the display memory under the control of the CPU 301 and which outputs data stored in the display memory as a video signal to a display device 308; 309, a printer interface; and 310, the above-described printer.

Next, an operation in the above construction will be described in a case where the power of the apparatus is turned on and the OS is started, and the application for digital watermarking is read from the HDD 304 to the RAM 303.

First, the detailed explanation of the operations of the error-correction parameter determination unit 205 and the error-correction coding unit 203 in the above-described FIG. 2A will be described with reference to a flowchart.

Figure 4:
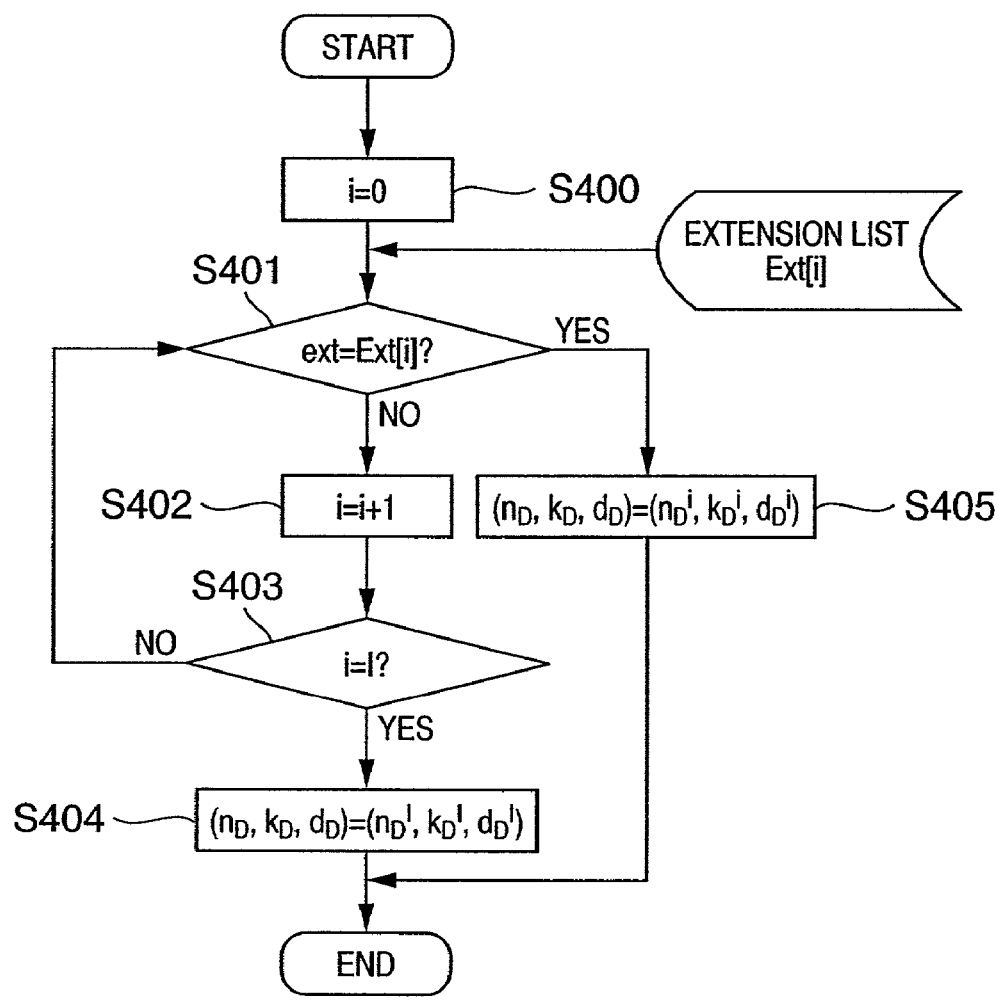
FIG. 4 is a flowchart showing a processing procedure of an error-correction parameter determination unit according to the first embodiment.

FIG. 4 shows a processing procedure of the error-correction parameter determination unit 205.

In the present embodiment, optimum BCH parameters $(n_D{}^i, k_D{}^i, d_D{}^i)$ are previously set for respective extensions of files, and stored in the hard disk 304 or the like in a status as shown in the list (table) of FIG. 5. In FIG. 5, the optimum parameter $(n_D{}^i, k_D{}^i, d_D{}^i)$ is set for each extension. Note that a parameter stored as Ext[I] is a parameter that is given to additional information corresponding to none of the extensions.

Further, prior to the following description, the user uses the application of the present embodiment to display an image in which additional information is to be embedded, and designates information to be embedded in the image via a dialog box or the like.

In FIG. 4, initial setting is made at step S400, and at steps S401 to S403, it is determined whether or not an extension of additional information (a file selected by the user) inputted from the terminal 206 in FIG. 2A exists on the list. If it is determined that the extension exists on the list, an optimum parameter $(n_D{}^i, k_D{}^i, d_D{}^i)$ for the extension is inputted into the error-correction coding unit 203. Further, if it is determined that the extension does not exist on the list, $(n_D{}^I, k_D{}^I, d_D{}^I)$ is determined as the BCH parameter.

Figure 6:
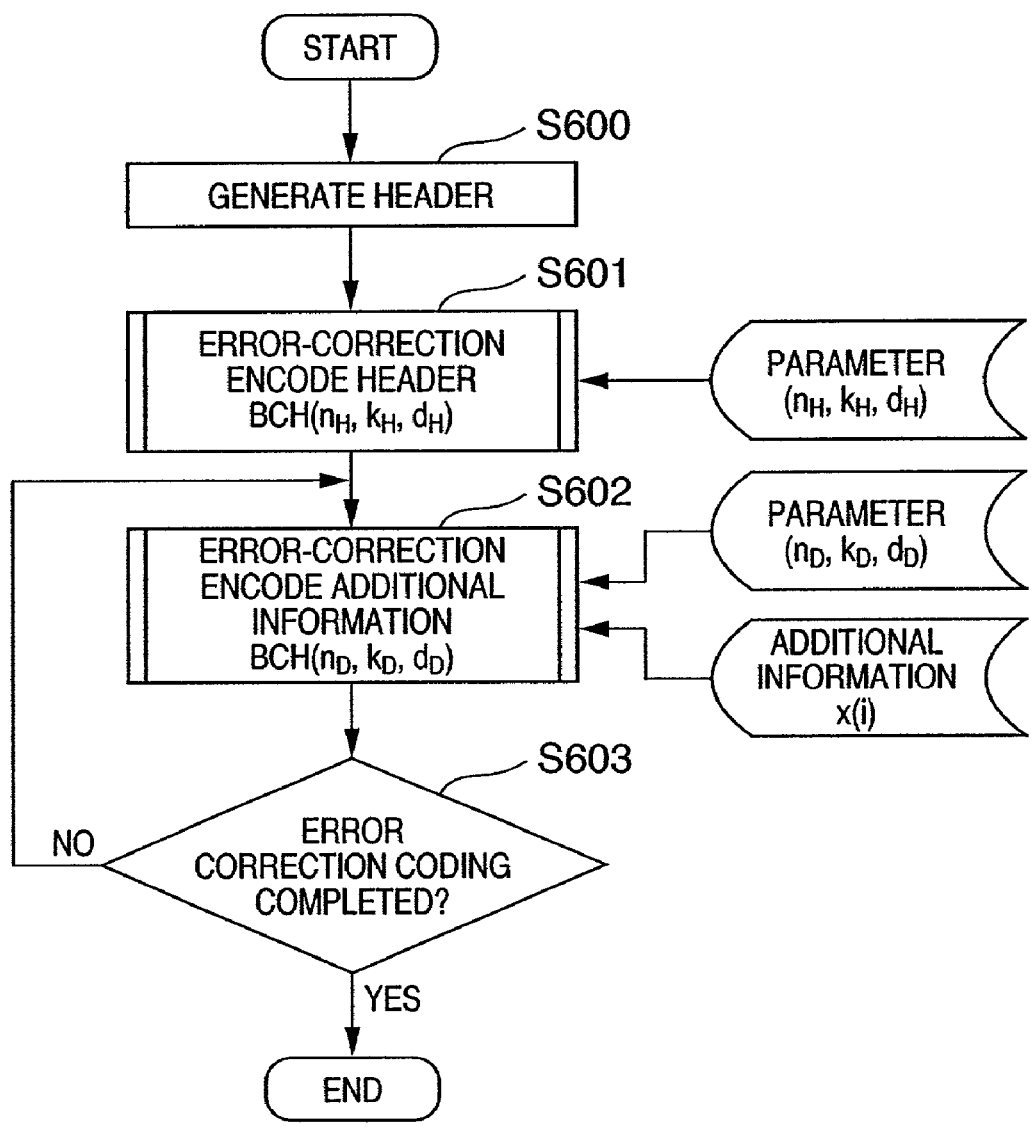
FIG. 6 is a flowchart showing a processing procedure of an error-correction coding unit according to the first embodiment.

FIG. 6 is a flowchart showing a processing procedure corresponding to the error-correction coding unit 203. Hereinbelow, the respective parts will be described with reference to the figure.

Figure 7:
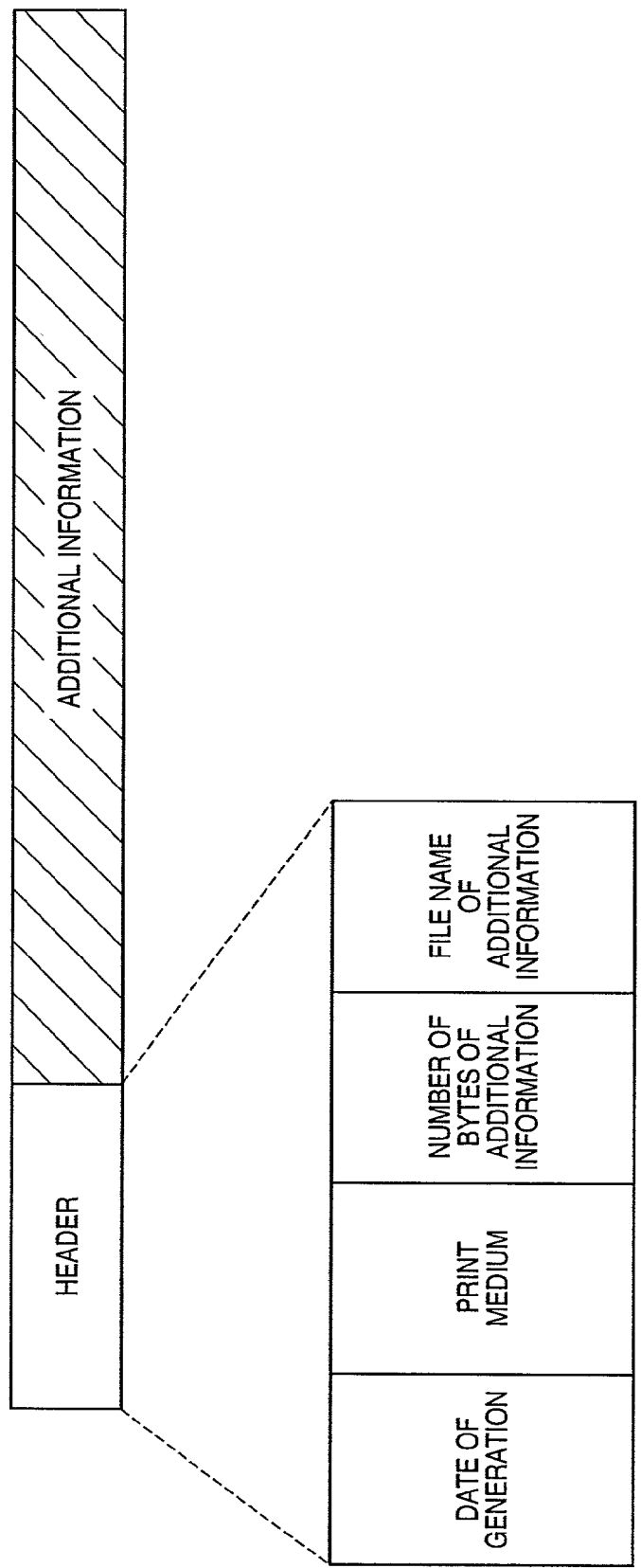
FIG. 7 is a schematic diagram showing the structure of a header according to the first embodiment.
Figure 9:
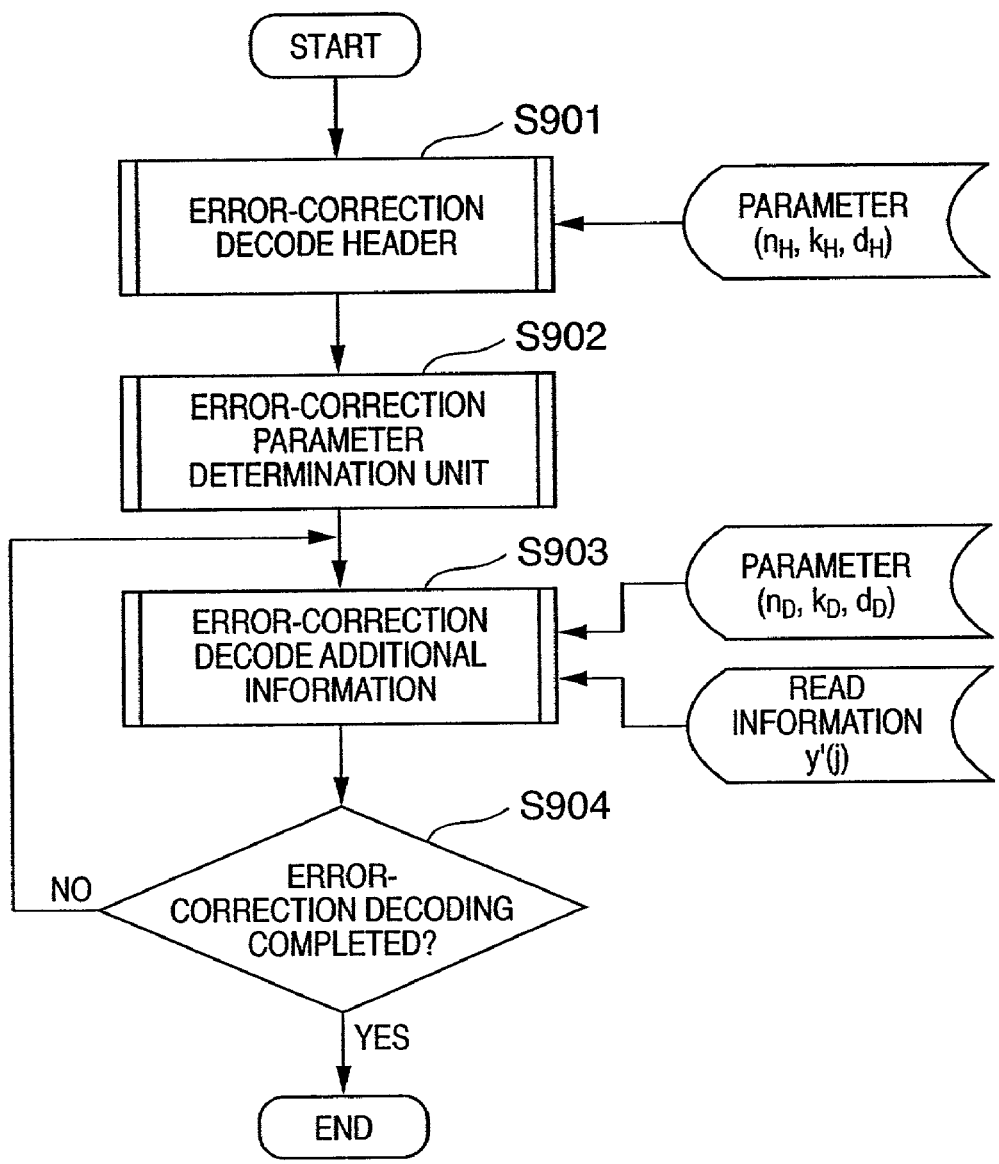
FIG. 9 is a flowchart showing a processing procedure of an error-correction decoding unit according to the first embodiment.

First, at step S600, a header of format for storing additional information is generated. FIG. 7 shows the format of information to be multiplexed in an image. The header holds a date of generation of multiplexed image, information on print medium, the size of additional information, a file name of the additional information and the like. At steps S601 and S602, check bits for error correction are added to the format as shown in FIG. 7. At step S601, BCH error-correction processing using the predetermined parameter $(n_H, k_H, d_H)$ is performed on the header. Note that as the information in the header must be reliably reproduced, the intensity of error correction is set to a maximum level. At step S602, the BCH error-correction processing is performed on the additional information using the parameter $(n_D, k_D, d_D)$ inputted from the error-correction parameter determination unit. In the present embodiment, the BCH code is used for dividing a bit stream to be subjected to error correction by $k_D$ bit and adding a check bit to the respective bits. As a result, multiplexed information y(i) outputted from the error-correction coding unit 203 is changed from a state as shown in FIG. 8A to that as shown in FIG. 8B. The generated multiplexed information y(i) is inputted into the additional information multiplexing unit.

The embedding processing is as described above. Then the image where the additional information has been embedded can be printed by the printer 310, stored into a storage medium, or transmitted via the network.

Next, the error-correction decoding unit 209 upon extraction of additional information from image data according to the present embodiment will be described. Since this processing is made by the same device construction as that shown in FIG. 3, the particular construction of the device will be omitted.

In the figure, at step S901, error-correction decoding using the parameter $(n_H, k_H, d_H)$ is performed on the header. As a result, the size of the additional information, the file name (file name (filename)+extension(ext)) stored in the data can be obtained. At step S902, the same processing as that of the error-correction parameter determination unit 205 is performed by using the obtained file name extension ext, to determine the error-correction parameter $(n_D, k_D, d_D)$. At step S903, error-correction decoding processing is performed on the data by using the determined parameter $(n_D, k_D, d_D)$, and additional information x'(i) resulted from the processing is outputted from the output terminal 210.

The first embodiment of the present invention is as descried above. Note that according to the present embodiment, only one file is used as additional information, however, similar processing can be performed even if plural files are selected as additional information.

Further, the output destination of the extracted additional information is selected in accordance with the extension of the additional information. For example, if the extension is WAV, the data is forwarded to an application program for the extension WAV, thereby sound reproduction and image reproduction are simultaneously performed.

<Second Embodiment>

Figure 10:
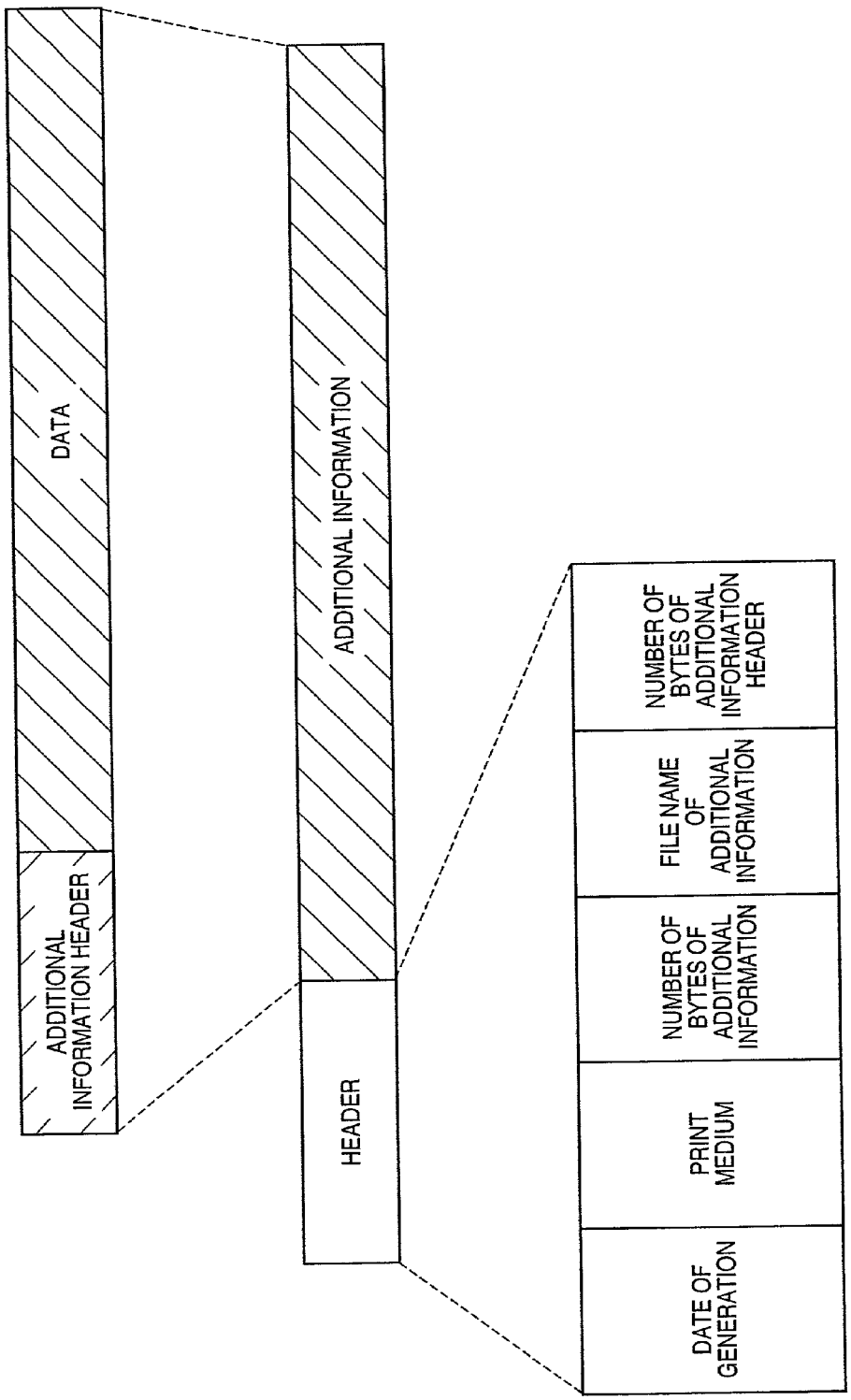
FIG. 10 is a schematic diagram showing a file format of additional information according to the first embodiment.

In the above first embodiment, the types of data with high redundancy are listed in advance, and if additional information corresponds to any of the listed data types, error-correction processing with comparatively low error-correction capability is performed, thereby the check bit rate in the multiplexable information is reduced. However, even a BMP file, generally with high redundancy, has information which must not be lost such as header information of the BMP file (FIG. 10). If the error-correction processing with low correction capability is performed on the header of such additional information file, there is a probability that the additional information cannot be completely reproduced. Accordingly, in the second embodiment, error-correction processing with comparatively high correction capability is performed on the header of low-redundant additional information, as in the case of the header of format, while error-correction coding with low correction capability is performed on only the data area.

Figure 11:
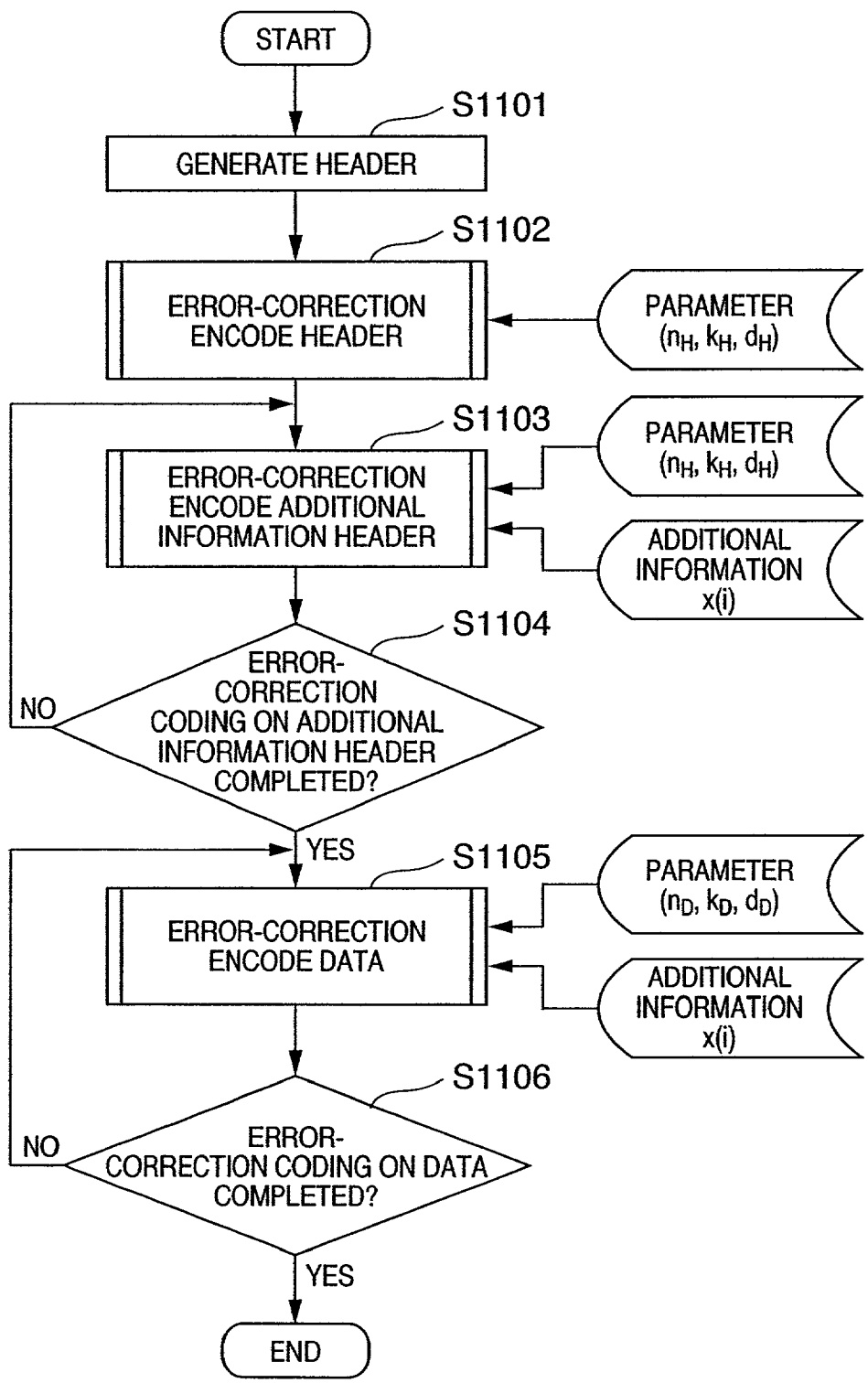
FIG. 11 is a flowchart showing a processing procedure of the error-correction coding unit according to a second embodiment of the present invention.

FIG. 11 is a flowchart showing a processing procedure of the error-correction coding unit 203 according to the second embodiment. Hereinbelow, description will be made about the present embodiment.

In the figure, first, at step S1101, the header of multiplexing format is generated. As shown in FIG. 10, the date of generation of multiplexed information, the type of print medium, the number of bytes of the entire additional information and the file name of the additional information are described in the header. In addition, in the present embodiment, the number of bytes of additional information header is added to the header. On the decoding side, the amount of this information is referred to and error-correction decoding is performed on the additional information header. Note that as the number of bytes of the additional information header depends on each extension, a column indicating the number of bites of the header is provided in the list (table) in FIG. 5.

At step S1102, the error-correction coding is performed on the header of the multiplexing format by using the parameter $(n_H, k_H, d_H)$.

At steps S1103 to S1104, error-correction coding is performed on the additional information header by using the parameter $(n_H, k_H, d_H)$.

At steps S1105 to S1106, error-correction coding is performed on the data by using the parameter $(n_D, k_D, d_D)$ inputted from the error-correction parameter determination unit 205. Note that the operation of the error-correction parameter determination unit 205 is the same as that described in the first embodiment.

By the above processing, the generated multiplexed information changes from a state as shown in FIG. 12A to that as shown in FIG. 12B. Since the data is generally subjected to error-correction coding with correction capability lower than that on the header, the amount of check bits for correction is reduced in case of the data.

Figure 13:
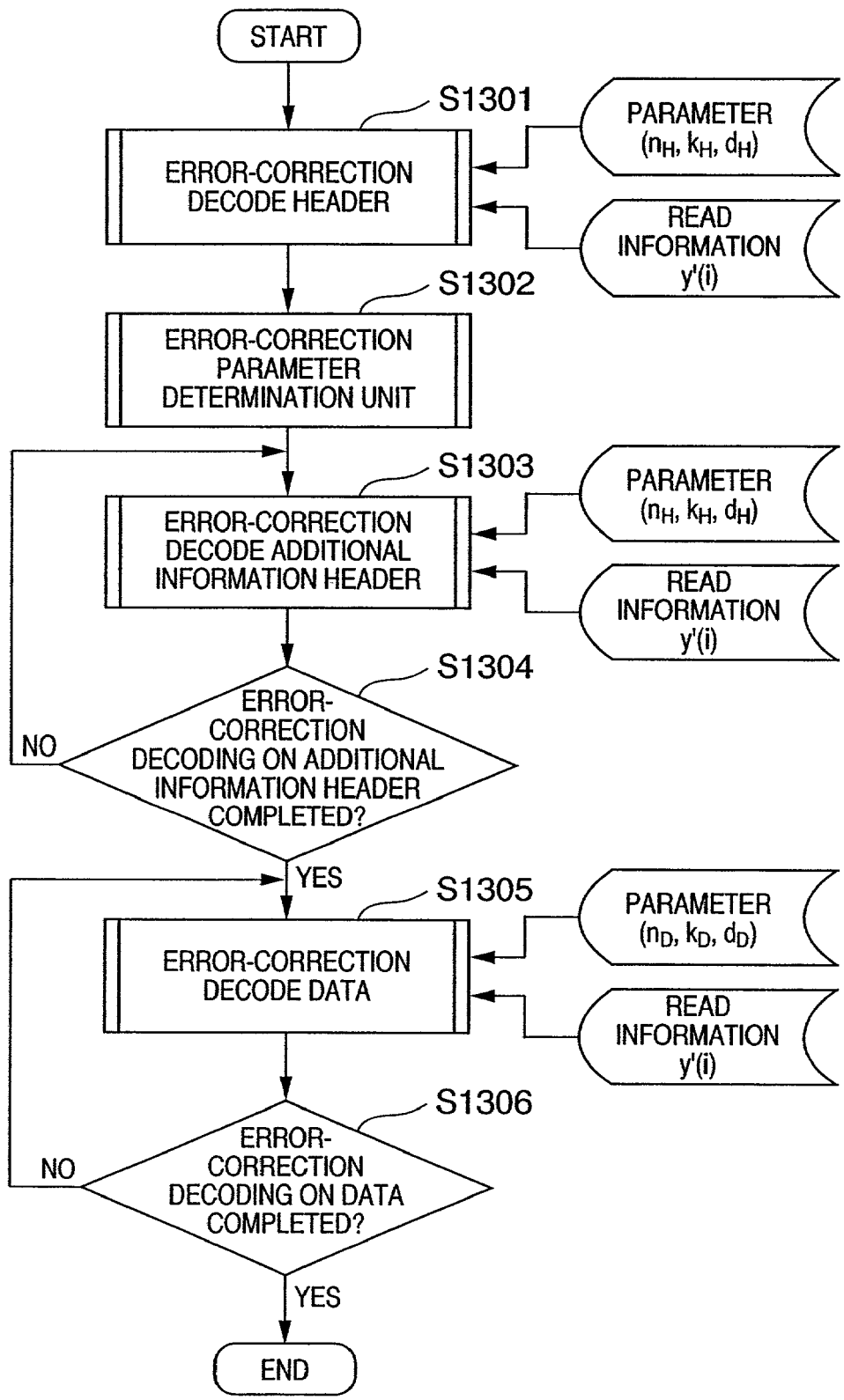
FIG. 13 is a flowchart showing a processing procedure of the error-coding decoding unit according to the second embodiment.

FIG. 13 is a flowchart showing a processing procedure of the error-coding decoding unit 209 according to the second embodiment. Hereinbelow, a description will be made with reference to the figure.

First at step S1301, error-correction decoding is performed on the header of the multiplexed information y'(i) extracted from the multiplexed image. At this time, the parameter $(n_H, k_H, d_H)$ is employed. As a result, the size of the additional information header, the size of the entire additional information and a file name and the like can be obtained.

Next, at step S1302, by using the extension of the additional information obtained at step S1301, the error-correction parameter $(n_D, k_D, d_D)$ depending on the extension of the data is determined as in the case of the first embodiment.

Next, at steps S1301 to S1304, the error-correction decoding is performed on the additional information header by using the parameter $(n_D, k_D, d_D)$. The decoding processing is performed for the number of bytes of the additional information header obtained at step S1301.

At steps S1305 to S1306, the error-correction decoding processing is performed by using the parameter determined at step S1302. The decoding processing is performed for the number of bytes obtained by subtracting the number of bytes of the additional information header from the number of bytes of the additional information obtained at step S1301. By the above processing, significant bits included in the high redundant additional information can be efficiently protected.

Figure 14A:
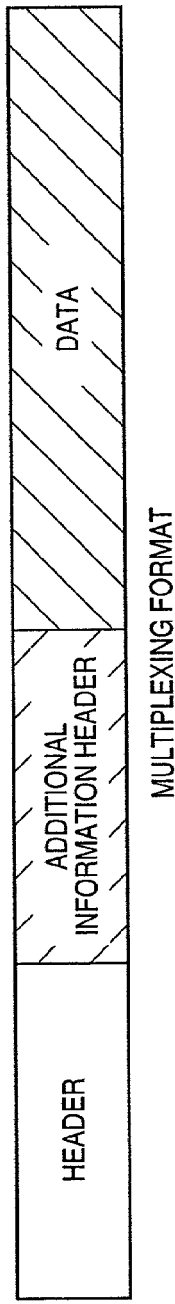
FIGS. 14A and 14B are schematic diagrams showing an example of format in a case where error correction is not performed on data.
Figure 14B:
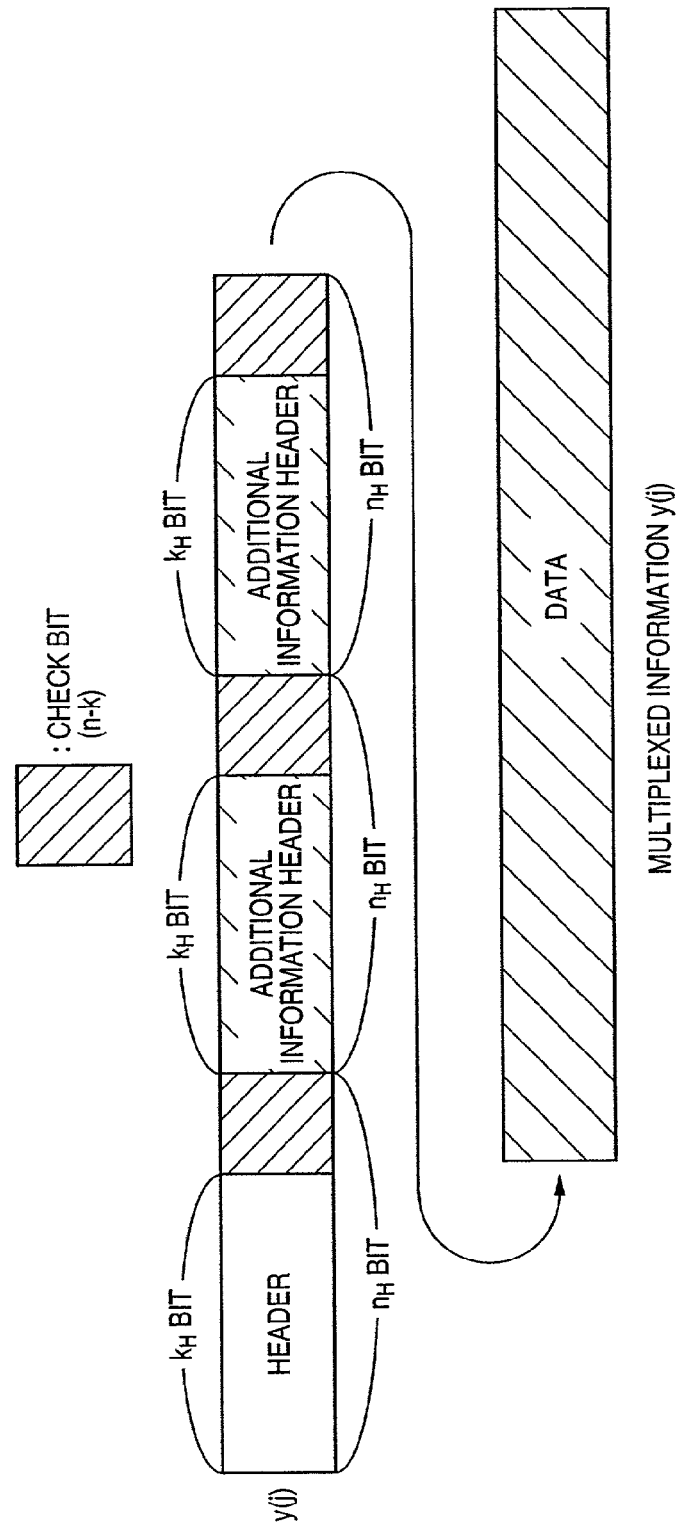

The second embodiment is as described above. Note that in the present embodiment, only one file is used as additional information, however, similar processing can be performed even if plural files are selected as additional information. Further, in the present embodiment, the error-correction processing is performed on the pure data by using the parameter, however, even a case where the error-correction processing is not performed on the data is also within the scope of the present invention. In such case, the multiplexed information is as shown in FIG. 14B.

The additional information multiplexing device which embeds information and the additional information extraction device which extracts the information have been described, however, the present invention is not limited to this combination of devices.

Further, in the embodiments, the above-described embedding and extraction of the additional information are respectively realized by application programs (these two functions may be realized by one application program), however, the embedding may be realized by a printer driver.

That is, if the embedding is applied to the printer driver, upon execution of printing on the application, a dialogue message for selecting whether or not additional information is to be embedded is displayed. If additional information is to be embedded, a window for selecting a file is displayed such that at least one file is selected. Thereafter, the above processing is performed, print data is generated and outputted.

Further, in the present embodiment, the apparatus has been described as an application program or printer driver which operates on a host computer, however, the apparatus may be included, as hardware or software, in a copier, a facsimile machine, a printer main body and the like.

Further, as described in the above embodiments, the significant part of the present invention can be realized by an application program or software such as a printer driver. Accordingly, it is apparent that the present invention can be applied to a computer program. Generally, when a program is installed in a computer, the program is installed by setting a storage medium such as a floppy disk or a CD-ROM in the computer. Accordingly, such storage medium is apparently included in the present invention as long as the storage medium holds a program to realize the above embodiments.

As described above, according to the present invention, when additional information is multiplexed in image information without degrading the quality of the image information, error-correction check bits adapted to the additional information can be set by using an error-correction capability which is variable in correspondence with the character of the additional information. Thus more additional information can be multiplexed. Especially, as change of occurrence of texture accompanying change of quantization condition is utilized in the error-diffusion method in code embedding, more additional information can be multiplexed.

Further, according to the embodiments, as additional information can be easily multiplexed in image information, service and application program to embed audio information or secret information in image information can be provided. Further, it is possible to suppress unauthorized duplication of bank notes, stamps, negotiable instruments and the like, or to prevent a violation of copyright of image information.

As described above, according to the first and second embodiments, as error-correction capability is determined in correspondence with the character of information to be embedded, a maximum amount of embedding can be ensured depending on information to be embedded.

<Third Embodiment>

First, the construction of the two types of image processing apparatuses according to the third embodiment of the present invention will be described.

Figure 15:
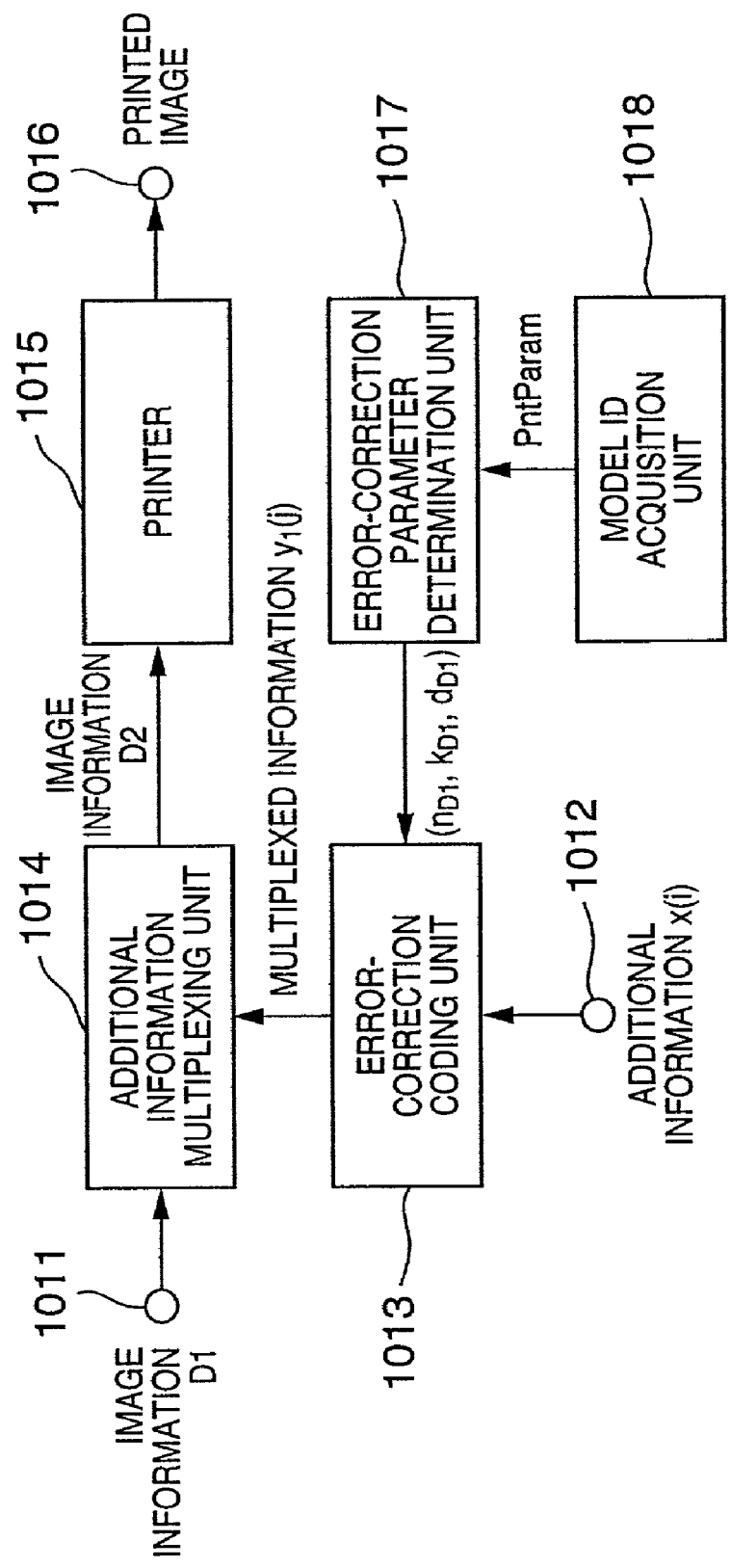
FIG. 15 is a block diagram showing the construction of an image processing apparatus according to a third embodiment of the preset invention which embeds additional information in image information and performs printing.

FIG. 15 is a block diagram showing the construction of an image processing apparatus according to a third embodiment of the preset invention which embeds additional information in image information and performs printing. Numeral 1011 denotes an input terminal for inputting multivalue image information D1. Further, numeral 1012 denotes an input terminal for inputting additional information x(i) having a size of arbitrary 1 bits to be embedded in the multivalue image information D1. The additional information x(i) includes information related to the image information D1 inputted from the input terminal 1011, e.g., information on copyright of the image information D1, information not related to the image information D1 such as audio information, text document information, other image information and the like.

The input terminal 1012 is connected to an error-correction coding unit 1013. The error-correction coding unit 1013 performs error-correction processing on the input additional information x(i). That is, check bits are added to the additional information, and the result is outputted as multiplexed information $y_1(j)$. Note that j>q holds. Various error correcting codes have been proposed. As representative code, Reed-Solomon code, BCH code, Fire code, Peterson code can be given. Any of these codes may be employed as error correcting code, however, the present embodiment uses the BCH code which is employed in various systems for its simple structure and high coding rate. Note that as the algorithm of the BCH coding has already been described in various documents, it will be omitted in the present specification.

In the present embodiment, the BCH code is represented as BCH(n,k,d) which means that the code length of the BCH code is n bits, k bits of the code length n bits are information bits, remaining n–k bits are check bits, and errors up to t bit can be corrected by this structure. Note that t means a maximum integer not exceeding d/2.

The error-correction coding unit 1013 is connected to an additional information multiplexing unit 1014. The additional information multiplexing unit 1014 embeds the multiplexed information y1(*j*) in the input image information D1. Further, the additional information multiplexing unit 1014 quantizes image information D2 obtained by embedding the multiplexed information y1 in the image information D1.

The additional information multiplexing unit 1014 is connected to a printer 1015. The printer 1015 print-outputs the image information D2 generated by the additional information multiplexing unit 1014 as a printed image 1016. The printer 1015 may be a printer such as an ink-jet printer, a laser printer or the like which realizes tonality representation by using the pseudo halftone processing.

Further, the error-correction coding unit 1013 is connected to an error-correction parameter determination unit 1017. The error-correction parameter determination unit 1017 determines a parameter $(n_{D1}, k_{D1}, d_{D1})$ necessary for the error-correction coding unit 1013. Note that the parameter $(n_{D1}, k_{D1}, d_{D1})$ indicates an error-correction parameter for the data.

Further, the error-correction parameter determination unit 1017 is connected to a model ID acquisition unit 1018. The model ID acquisition unit 1018 inputs a parameter PntParam for designation of printer. The error-correction parameter determination unit 1017 determines the parameter $(n_{D1}, k_{D1}, d_{D1})$ based on the input parameter PntParam.

Note that the data format of the additional information has a header and data. In the header, a predetermined error-correction parameter $(n_H, k_H, d_H)$ is used regardless of data type, and error-correction coding with comparatively high correction capability is performed.

That is, the feature of the third embodiment of the present invention is that the image processing apparatus having multiplexing means (additional information multiplexing unit 1014) for embedding additional information in image information, and at least one print means (printer) for print-outputting the image information where the additional information is embedded, comprises designation means (model ID acquisition means 1018) for designating print means for print-outputting the image information, error-correction parameter determination means (error-correction parameter determination unit 1017) for determining an error-correction parameter in accordance with the designated print means, and error-correction coding means (error-correction coding unit 1013) for generating multiplexed information where the additional information is error-correct encoded by using the determined error-correction parameter, and that the multiplexing means embeds the multiplexed information in the image information.

Figure 16:
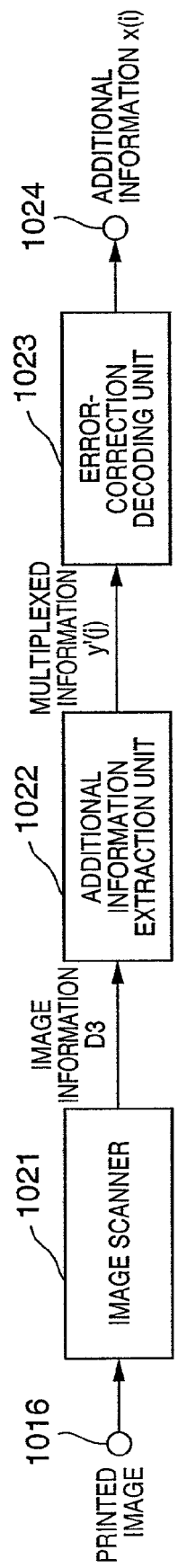
FIG. 16 is a block diagram showing the construction of the image processing apparatus according to the third embodiment which inputs a printed image by an image scanner and extracts additional information.

Further, FIG. 16 is a block diagram showing the construction of the image processing apparatus according to the third embodiment which inputs a printed image by an image scanner and extracts additional information. In FIG. 16, an image scanner 1021 optically reads a printed image 1016 printed by the image processing apparatus in FIG. 15 and converts read data into image information D3. The image scanner 1021 is connected to an additional information extraction unit 1022. The additional information extraction unit 1022 extracts multiplexed information $y'_1(j)$ as embedded additional information from the image information D3 of the printed image 1016.

The additional information extraction unit 1022 is connected to the error-correction decoding unit 1023. The error-correction decoding unit 1023 performs error-correction decoding processing on the extracted multiplexed information $Y_1'(j)$ to obtain the original additional information x(i). The obtained additional information x(i) is outputted to an output terminal 1024.

Figure 17:
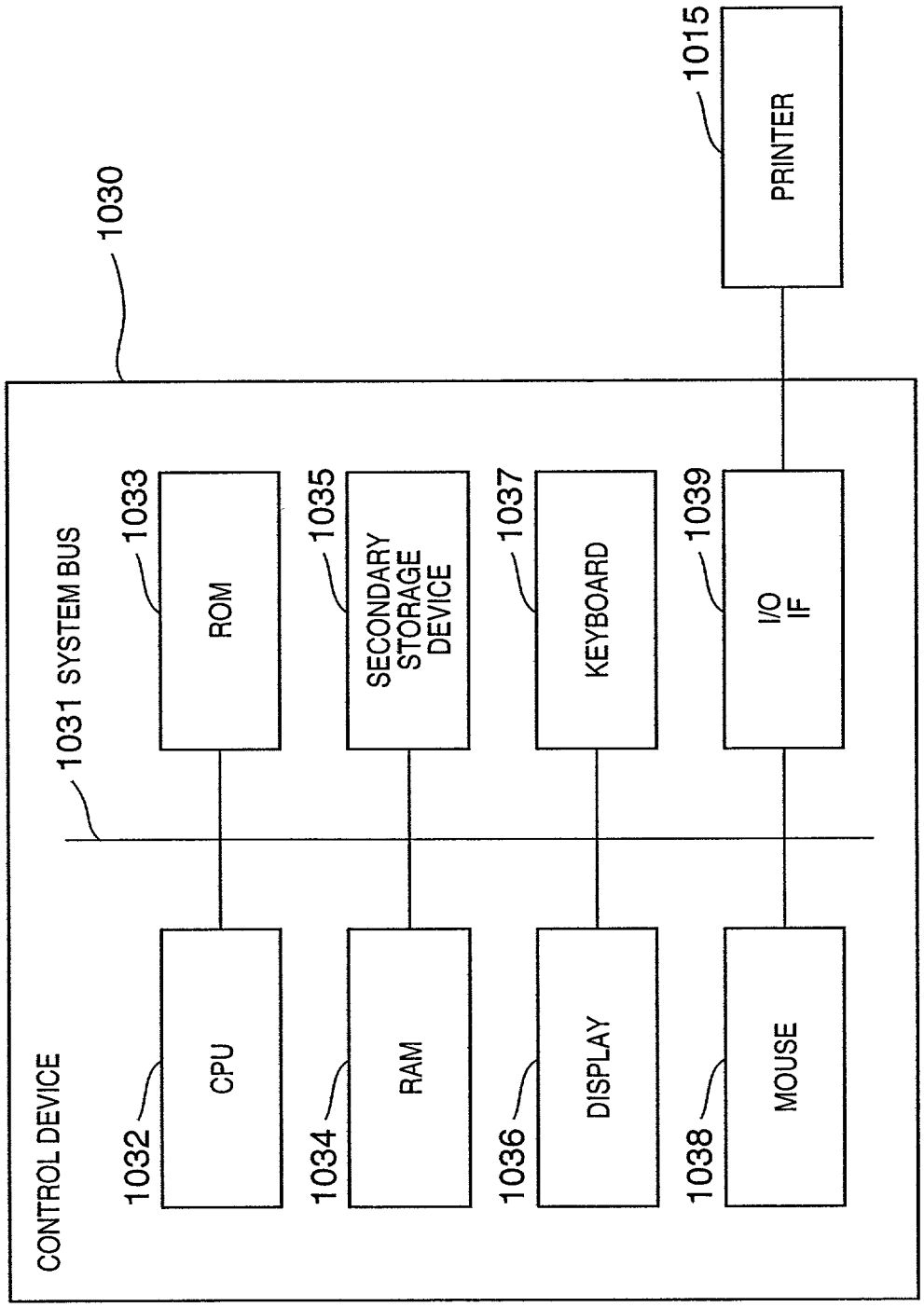
FIG. 17 is a block diagram showing the construction of a control unit which performs operations of respective processing units.

Note that the processing described below is performed by using a control device 1030 as shown in FIG. 17 which is a block diagram showing the construction of the control unit to perform operations of respective processing units. In FIG. 17, a CPU 1032, a ROM 1033, a RAM 1034 and a secondary storage device 1035 such as a hard disk are connected to a system bus 1031. Further, as a user interface, a display 1036, a keyboard 1037 and a mouse 1038 are connected to the CPU 1032. Further, a printer 1015 for image output is connected via an I/O interface 1039.

Figure 18:
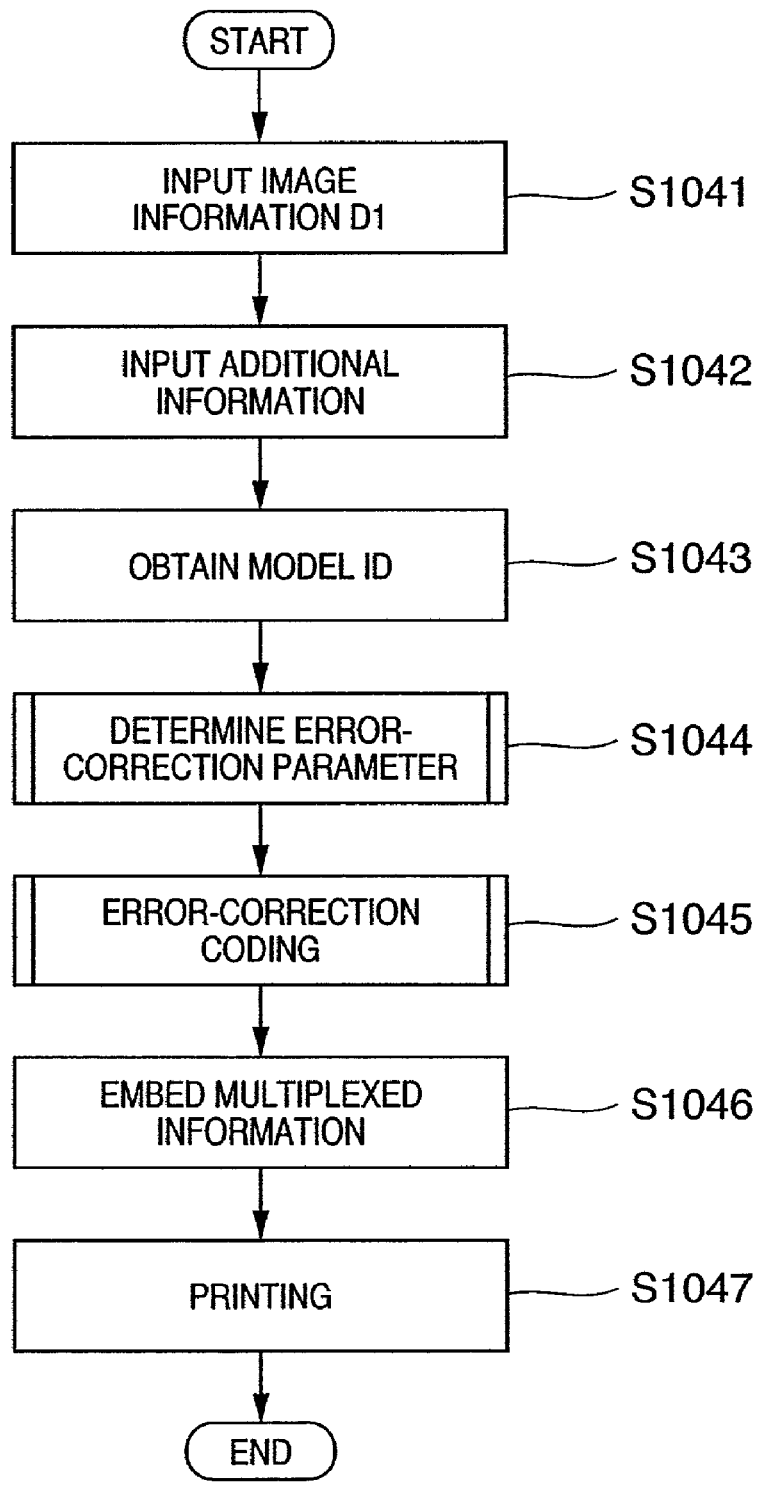
FIG. 18 is a flowchart showing an operation procedure of the image processing apparatus in FIG. 15.

Next, an operation procedure of the image processing apparatus according to the embodiment will be described in detail. FIG. 18 is a flowchart showing the operation procedure of the image processing apparatus in FIG. 15.

First, the image information D1 is inputted from the input terminal 1011 (step S1041). Next, the additional information x(i) to be multiplexed in the image information D1 is inputted from the input terminal 1012 (step S1042). Further, the parameter PntParam indicating the type of the printer 1015 is inputted from the model ID acquisition unit 1018 (step S1043). The error-correction parameter determination unit 1017 determines the error-correction parameter $(n_{D1}, k_{D1}, d_{D1})$ based on the input parameter PntParam (step S1044).

Next, an operation procedure of the error-correction parameter determination unit 1017 will be described. In the present embodiment, an optimum BCH parameter $(n_{D1}{}^m, k_{D1}{}^m, d_{D1}{}^m)$ is previously determined for each model name Name[m] of m types of printers. FIG. 19 is a table showing a list stored in a secondary storage device 1035 in a control device 1030 for multiplexing or decoding. In FIG. 19, the parameter $(n_{D1}{}^M, k_{D1}{}^M, d_{D1}{}^M)$ stored as the M-th parameter is a parameter which is selected if none of the printer model names is found.

That is, the feature of the third embodiment of the present invention is that the apparatus further comprises list holding means (secondary storage device 1035) for holding a list of error-correction parameters corresponding to plural print means, and that the error-correction parameter determination means selects an error-correction parameter corresponding to a designated print means from the list. Further, the third embodiment is characterized in that the error-correction parameter has a maximum addable information amount in each print means.

In the list in FIG. 19, the number of information bits $k_{D1}$ included in 255 bits decreases from the top to the bottom while the number of bits which can be error-corrected increases. That is, the present embodiment is described on the assumption that the performance of a Printer A is higher than that of a Printer B, and that of the Printer B is higher than that of a Printer C, which causes little ill effect on image formation, since it can be considered that the error rate upon reading of additional information from an image printed by the Printer A is lower than that in use of the Printer C.

Figure 20:
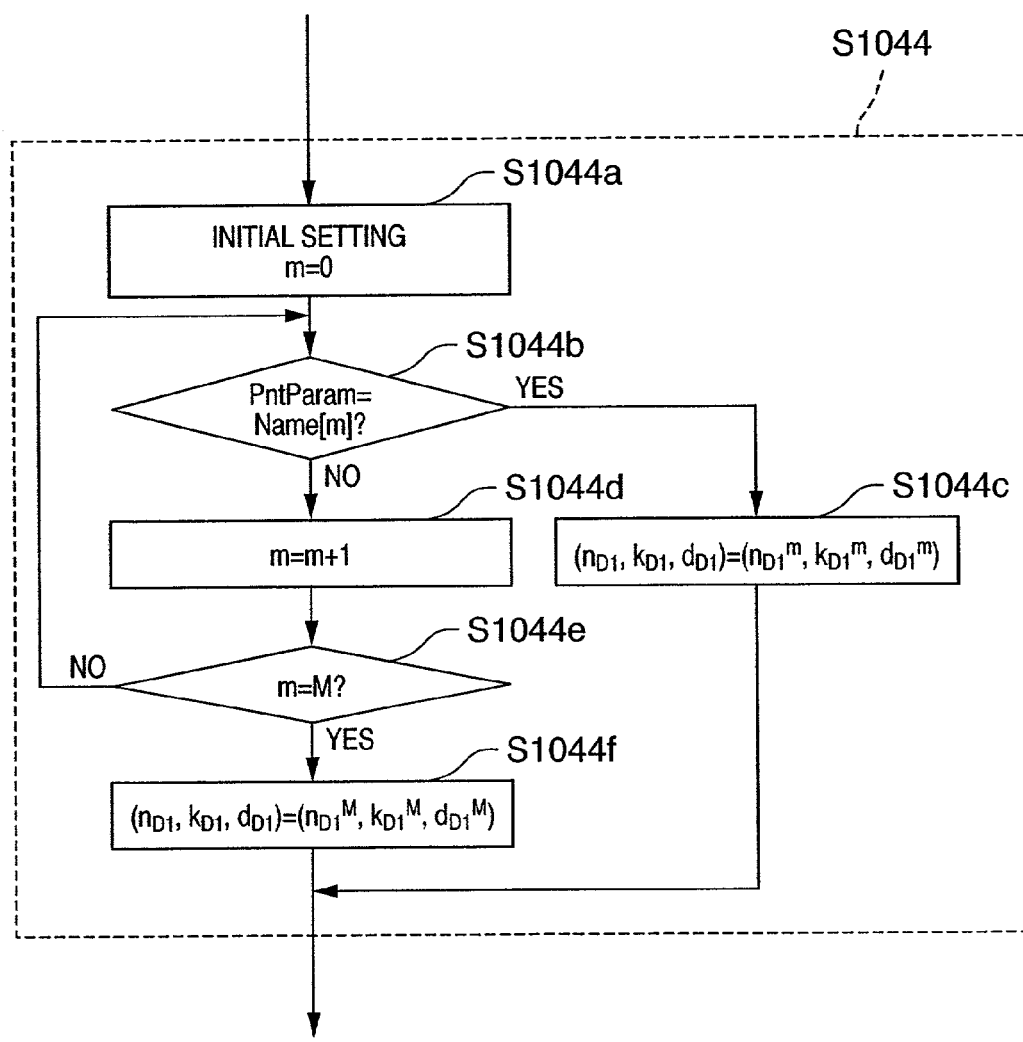
FIG. 20 is a flowchart showing an operation procedure of an error-correction parameter determination unit 1017 at step S1044 in FIG. 18.

FIG. 20 is a flowchart showing an operation procedure of the error-correction parameter determination unit 1017 at step S1044 in FIG. 18. First, initial setting is performed in the error-correction parameter determination unit 1017, and the variable m is set to 0 (step S1044a). Next, it is determined whether or not the parameter PntParam obtained by the model ID acquisition unit 1018 exists in correspondence with m=0 on the list (step S1044b) As a result, if it is determined that the parameter PntParam exists in correspondence with m=0 on the list (YES), the parameter $(n_{D1}{}^m, k_{D1}{}^m, d_{D1}{}^m)$ optimum for the parameter PntParam is inputted as the parameter $(n_{D1}, k_{D1}, d_{D1})$ into the error-correction coding unit 1013 (step S1044c).

On the other hand, if it is determined that the parameter PntParam does not exist in correspondence with m=0 on the list (NO), m is incremented such that m=m+1 holds (step S1044d). Then, it is determined whether or not m=M holds (step S1044e). As a result, if it is determined that m=M does not hold (NO), the process returns to step S1044b, at which it is determined whether or not the parameter PntParam corresponds to m on the list. On the other hand, if it is determined at step S1044e that m=M holds (YES), the optimum parameter $(n_{D1}{}^M, k_{D1}{}^M, d_{D1}{}^M)$ is inputted as the parameter $(n_{D1}, k_{D1}, d_{D1})$ into the error-correction coding unit 1013 (step S1044f). In this manner, the error correcting code $(n_{D1}{}^m, k_{D1}{}^m, d_{D1}{}^m)$ is determined.

The error-correction parameter $(n_{D1}, k_{D1}, d_{D1})$ determined by the error-correction parameter determination unit 1017 is inputted into the correction-correction coding unit 1013, and the additional information x(i) is multiplexed (step S1045). Next, an operation procedure of the error-correction coding unit 1013 will be described.

Figure 21:
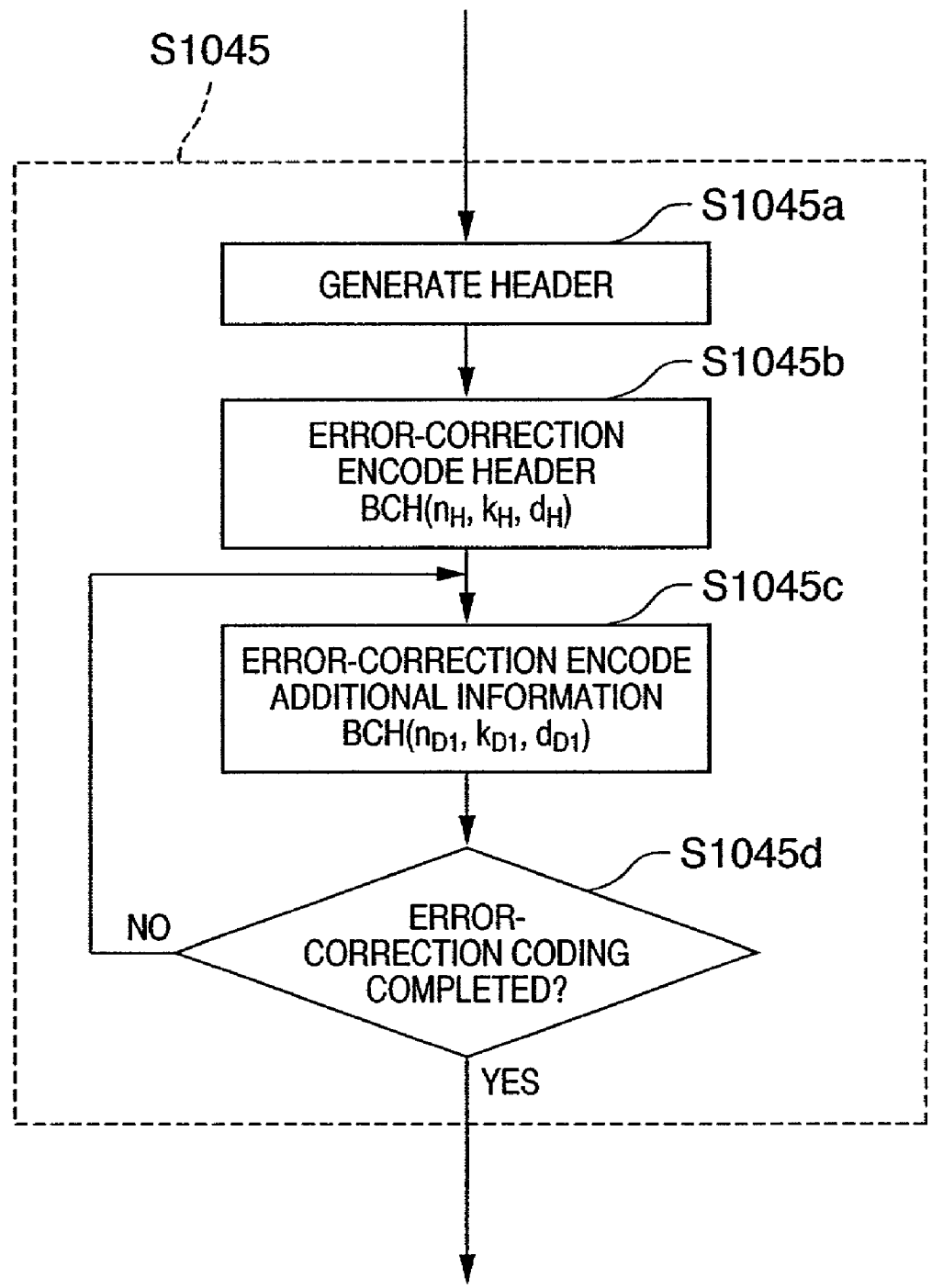
FIG. 21 is a flowchart showing an operation procedure of an error-correction coding unit 1013.
Figure 22:
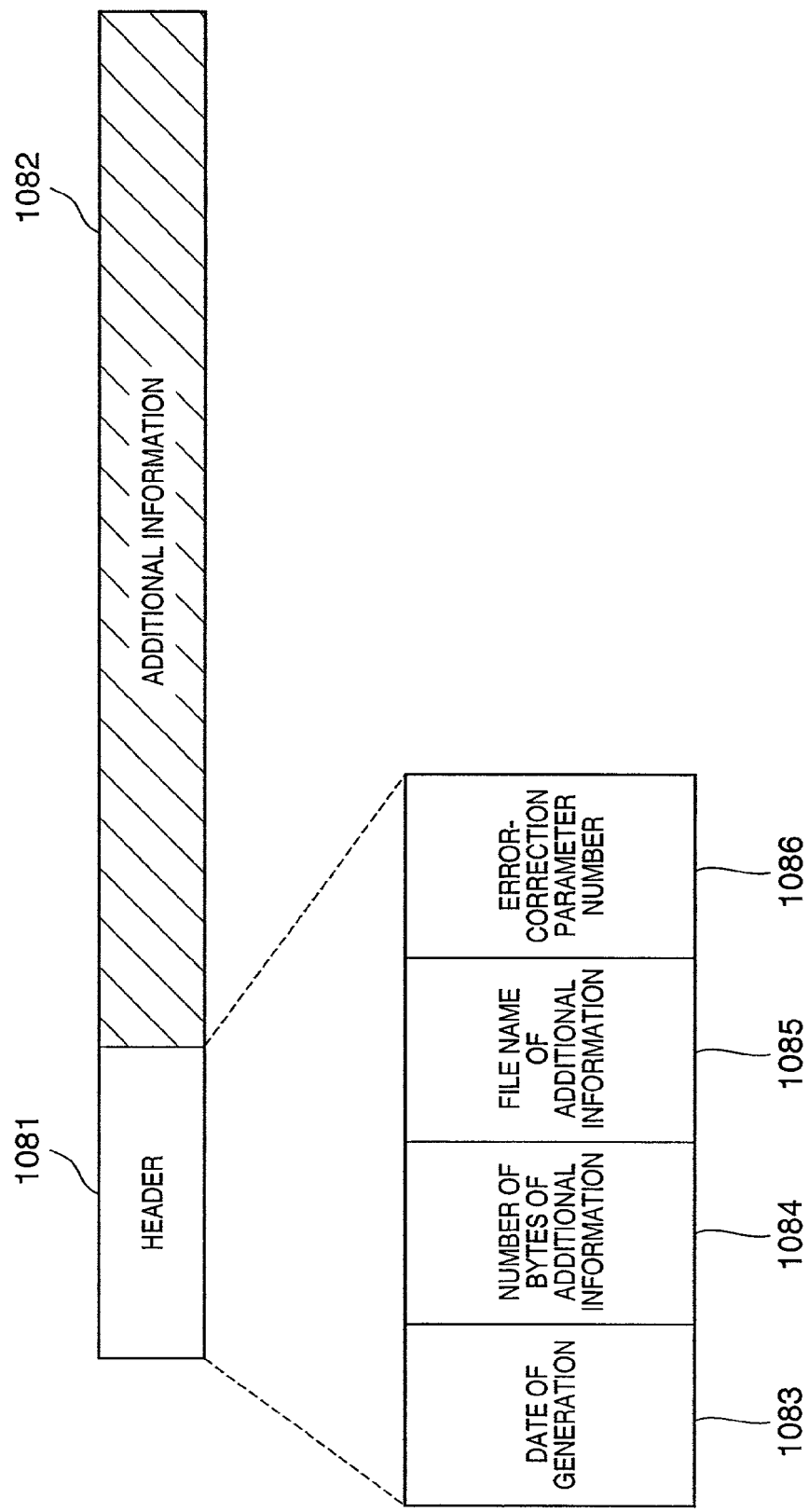
FIG. 22 is a schematic diagram showing a data format of additional information multiplexed in an image.

FIG. 21 is a flowchart showing the operation procedure of the error-correction coding unit 1013. In the error-correction coding unit 1013, first, a header is generated in a data format for storing the additional information x(i) inputted from the input terminal 1012 (step S1045a). FIG. 22 is a schematic diagram showing the data format of additional information multiplexed in the image. In the present embodiment, the data format of additional information briefly has a header 1081 and additional information 1082. Information such as date of generation of multiplexed image 1083, the number of bytes of additional information 1084 as the size of the additional information, an additional information file name 1085, and an error-correction parameter number 1086 are stored in the header 1081. Note that the error-correction parameter number 1086 is information to specify an error-correction parameter used for the additional information, i.e., one of the numbers in the list of FIG. 19.

Next, the error-correction check bits are added to the additional information in the data format in FIG. 22. First, the BCH error-correction processing is performed on the header 1081 by using the parameter $(n_H, k_H, d_H)$ (step S1045b). Further, the BCH error-correction processing is performed on the additional information 1082 by using the parameter $(n_{D1}, k_{D1}, d_{D1})$ inputted from the error-correction parameter determination unit 1037 (step S1065c). Then it is determined whether or not the error-correction coding has been completed (step S1965d). As a result, if it is determined that the error-correction coding has been completed (YES), the processing at the error-correction coding unit 1033 ends. On the other hand, if it is determined that the error-correction coding has not been completed (NO), the process returns to step S1065c, at which the error-correction coding is performed.

Figure 23:
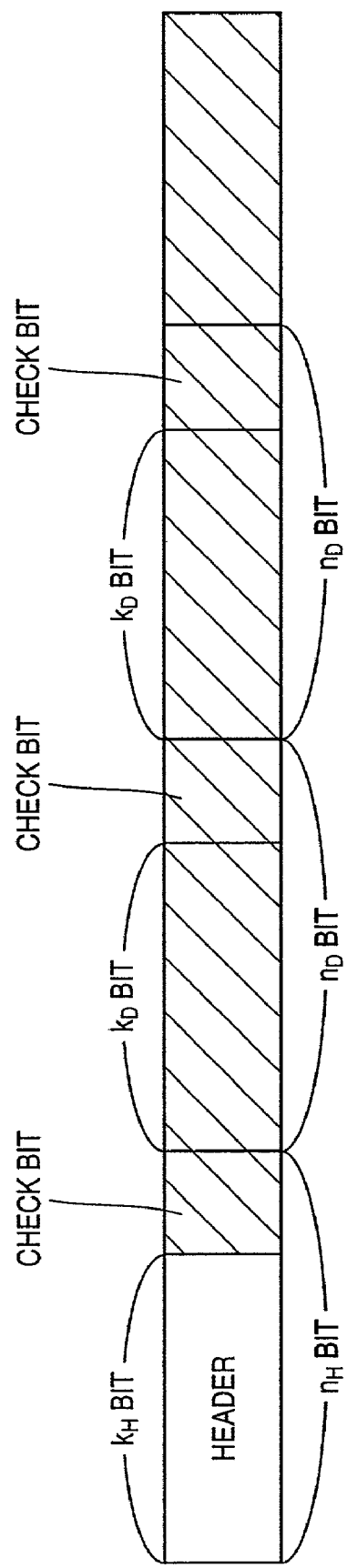
FIG. 23 is a schematic diagram showing the structure of multiplexed information $y_1(j)$.

The BCH error-correction processing used in the present embodiment divides a bit stream subjected to error correction by $k_D$ bits, and adds $n_D-k_D$ check bits to the respective $k_D$ bit blocks. As a result, the multiplexed information $y_1(j)$ outputted from the error-correction coding unit 1033 has a structure as shown in FIG. 23 which is a schematic diagram showing the structure of the multiplexed information $y_1(j)$.

The generated multiplexed information $y_1(j)$ is inputted into the additional information multiplexing unit 1014. The additional information multiplexing unit 1014 embeds the multiplexed information y1(j) in the image information D1 as the image information D2 (step S1046). The generated image information D2 is print-outputted by the printer 1015, as the printed image 1016, on a print sheet or the like (step S1047).

Figure 24:
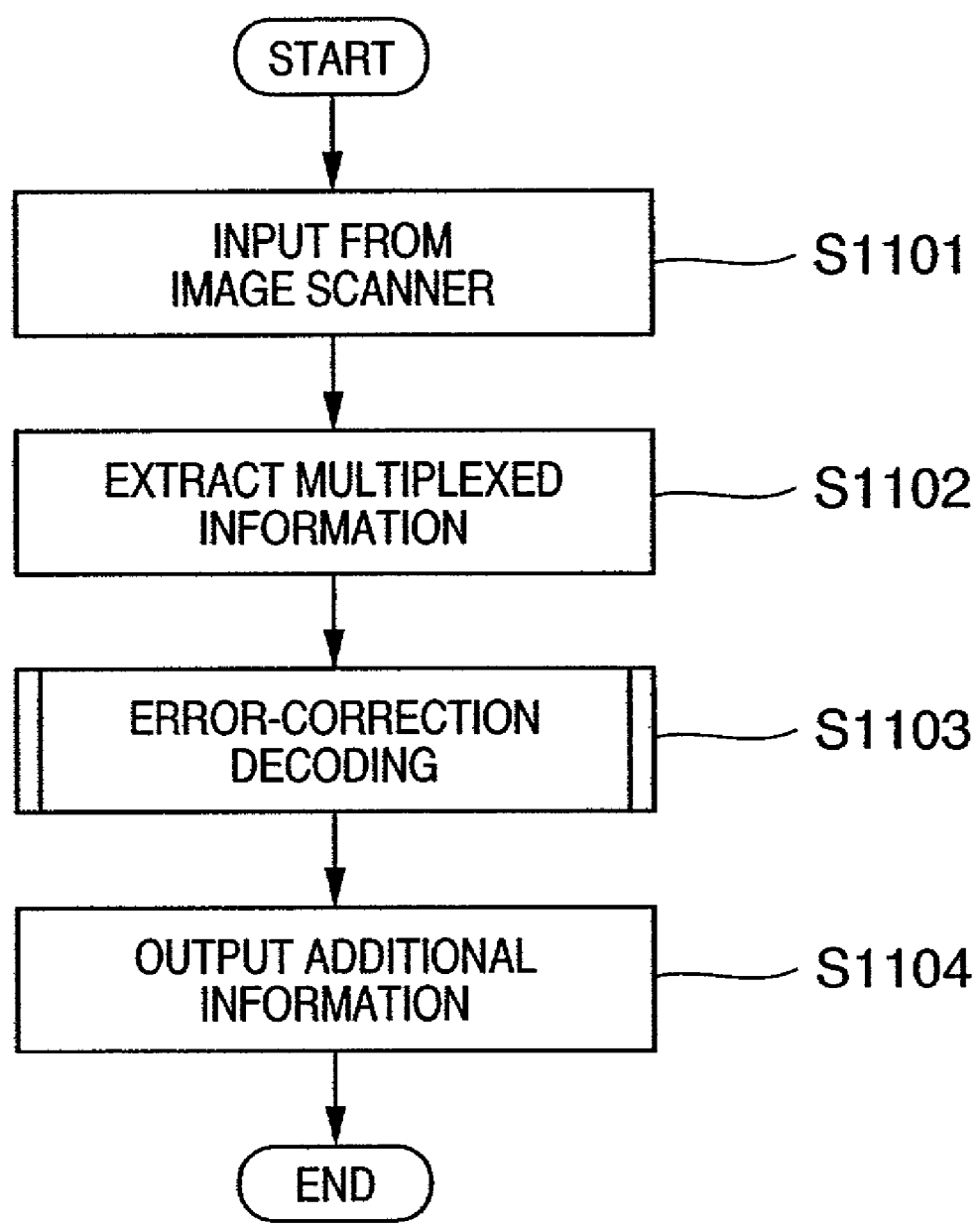
FIG. 24 is a flowchart showing an operation procedure of the image processing apparatus in FIG. 16.

Next, the image processing apparatus which inputs a printed image by an image scanner and extracts additional information will be described. FIG. 24 is a flowchart showing an operation procedure of the image processing apparatus in FIG. 16.

The printed image 1016 generated by the image processing apparatus in FIG. 15 is inputted from the image scanner 1021, and converted to the image information D3 (step S1101). Then the image information D3 is inputted into the additional information extraction unit 1022, and the multiplexed information $y'_1(j)$ as multiplexed additional information is extracted from the image information D3 (step S1102). Further, the error-correction decoding unit 1023 performs the error-correction decoding on the extracted multiplexed information $y_1'(j)$ (step S1103). The error-correction decoding will be described in more detail.

Figure 25:
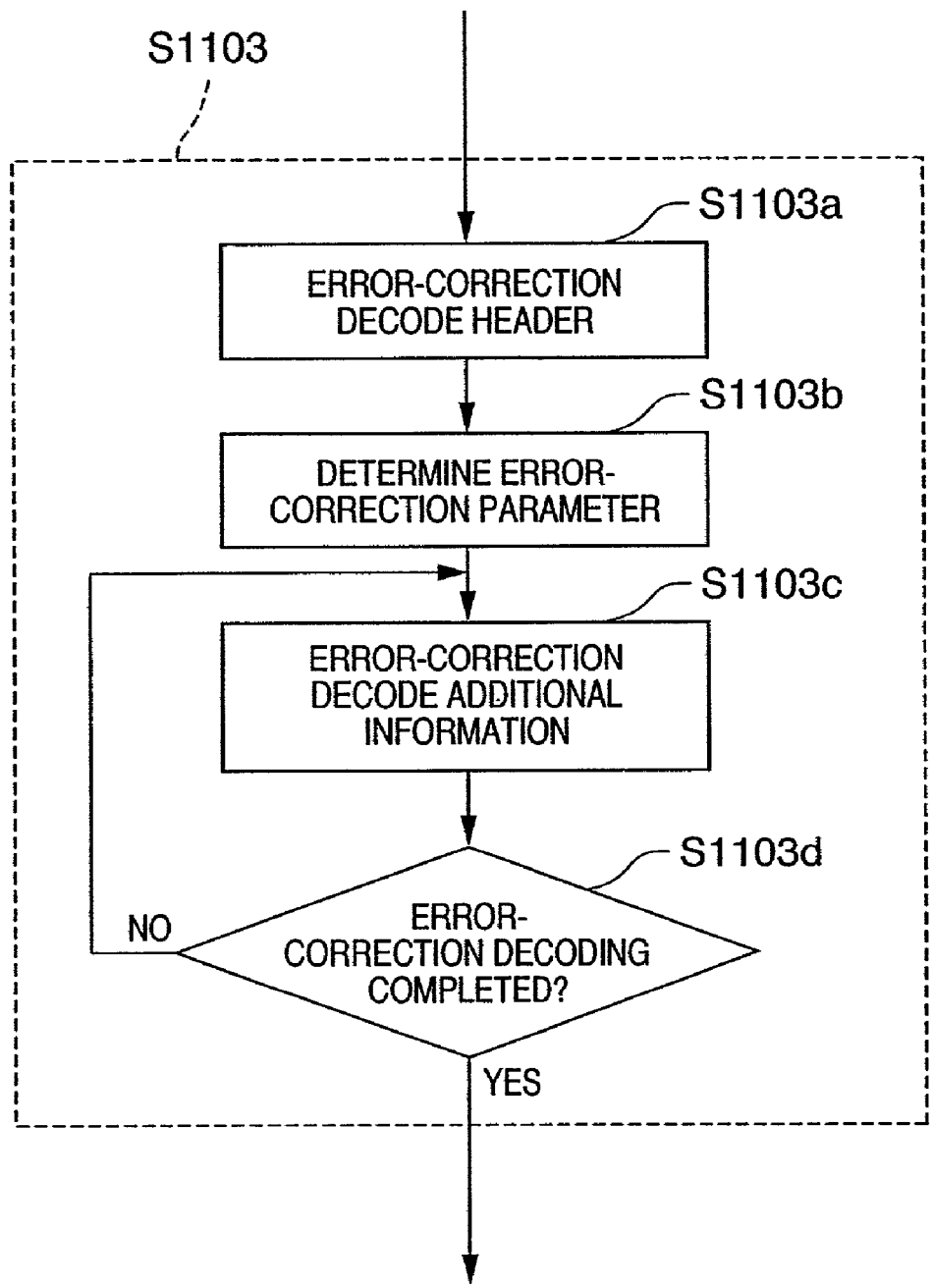
FIG. 25 is a flowchart showing the operation procedure of an error-correction decoding unit 1023 in detail.

FIG. 25 is a flowchart showing the operation procedure of the error-correction decoding unit 1023 in detail. The error-correction decoding unit 1023 first performs the error-correction decoding on the header 1081 in FIG. 22 by using the parameter $(n_H, k_H, d_H)$ (step S1103a). As a result, the error-correction parameter number 1086 used in coding with the information stored in the header 1081 such as the number of bytes of additional information 1084 and the additional information file name 1085, can be obtained.

Next, the error-correction parameter $(n_{D1}, k_{D1}, d_{D1})$ is determined by using the obtained error-correction parameter number 1086 (step S1103b). As the list in FIG. 19 is held in the secondary storage device 1035 of the control device 1030 which performs decoding processing as shown in FIG. 17, the error-correction parameter can be easily determined. When the error-correction parameter $(n_{D1}, k_{D1}, d_{D1})$ has been determined, the error-correction decoding processing is performed on the additional information 1082 (step S1103c). Then it is determined whether or not the error-correction decoding has been completed (step S1103d). As a result, if it is determined that the error-correction decoding has been completed (YES), the processing at the error-correction decoding unit 1023 ends. On the other hand, if it is determined that the error-correction decoding has not been completed (NO), the process returns to step S1103c to continue the error-correction decoding.

The additional information x(i) obtained at step S1103 is outputted from the output terminal 1024 (step S1104).

The third embodiment of the present invention is as described above. Note that in the present embodiment, the printer model name is used as the parameter PntParam necessary for determination of error-correction parameter. Further, the parameter PntParam may be a combination of printer model name and a print resolution if a print resolution can be selected for the printer from plural types of print resolutions. FIG. 26 is a table showing a list of parameters PntParam as combinations of printer model and print resolution. Further, the parameter may be only the print resolution.

Further, in the list in FIG. 19, with degradation of printer performance, increase in error rate is predicted and higher-performance error correcting code is used, however, the present invention is not limited to this arrangement. That is, in a low-price and low performance ink-jet printer or the like, the area of ink drop is wider and visual graininess is higher in comparison with a high price and high performance printer. Accordingly, in a case where printing is made by using the low-performance printer, when additional information is read from a printout by using the method disclosed in Japanese Published Unexamined Patent Application No. 2001-148778, the error rate is not necessarily increased, rather it may be lowered. In such case, in the list in FIG. 19, the error-correction capability should be lowered as the printer performance is lowered.

<Fourth Embodiment>

In the above-described third embodiment, as a factor that influences the error rate upon reading of additional information, the difference in performance among the printer models is taken into consideration. As an optimum error-correction parameter is previously set for each printer model, the relation between the amount of additional information and the number of check bits for error correction is optimized.

In the fourth embodiment, as a factor that influences the error rate upon reading of additional information, a print mode set by the user upon printing is considered.

Figure 27:
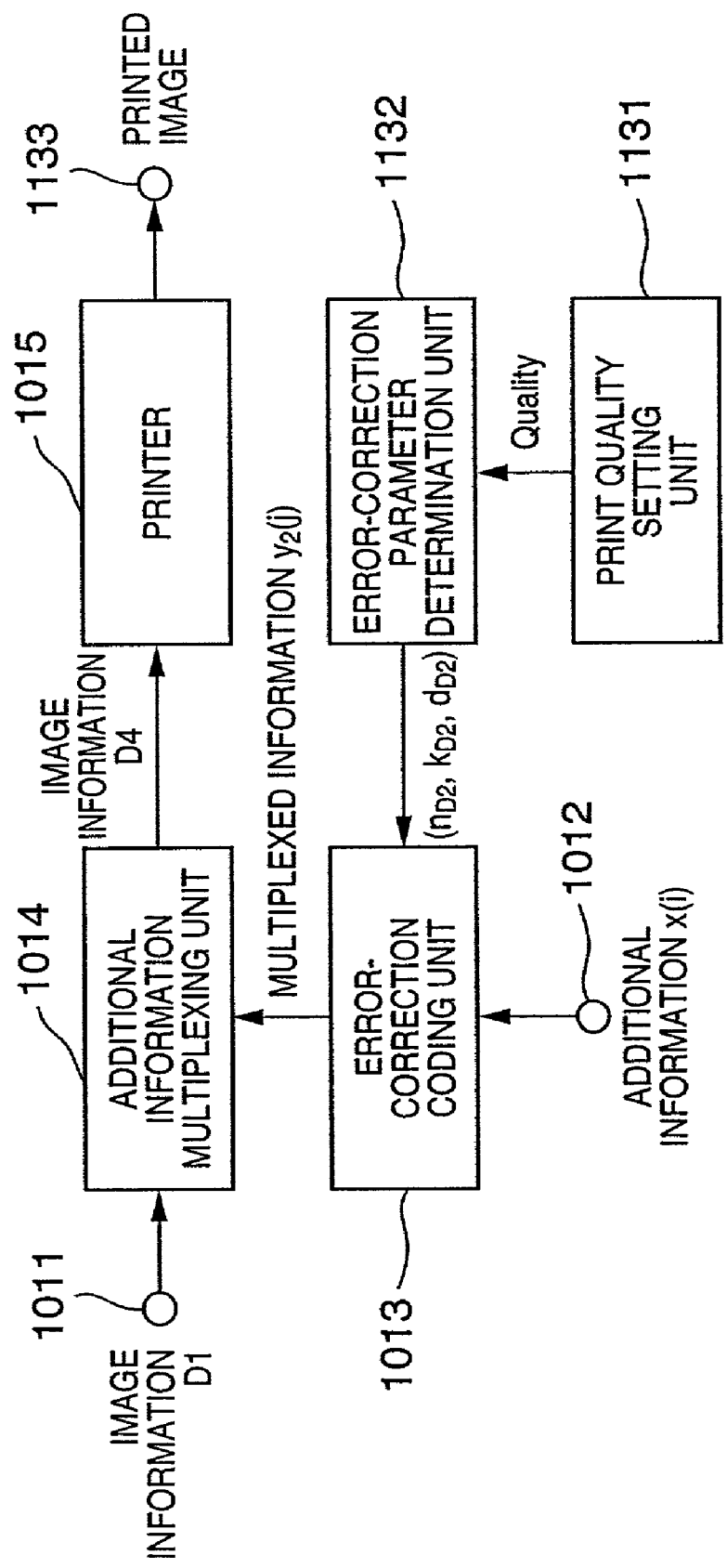
FIG. 27 is a block diagram showing the construction of the image processing apparatus according to a fourth embodiment of the present invention which embeds additional information in image information and performs printing.

FIG. 27 is a block diagram showing the construction of the image processing apparatus according to the fourth embodiment of the present invention which embeds additional information in image information and performs printing. In FIG. 27, the input terminals 1011 and 1012, the error-correction coding unit 1013, the additional information multiplexing unit 1014 and the printer 1015 have the same roles and operations as those in FIG. 15 in the third embodiment.

That is, the feature of the fourth embodiment of the present invention is that the image processing apparatus having multiplexing means (additional information multiplexing unit 1014) for embedding additional information in image information, and at least one print means (printer 1015) for print-outputting the image information where the additional information is embedded, comprises print quality setting means (print quality setting unit 1131) for setting print quality of the print means, error-correction parameter determination means (error-correction parameter determination unit 1132) for determining an error-correction parameter in correspondence with the set print quality, and error-correction coding means (error-correction coding unit 1013) for generating multiplexed information where the additional information is error-correction encoded by using the determined error-correction parameter, and that the multiplexing means embeds the multiplexed information in the image information.

Figure 28:
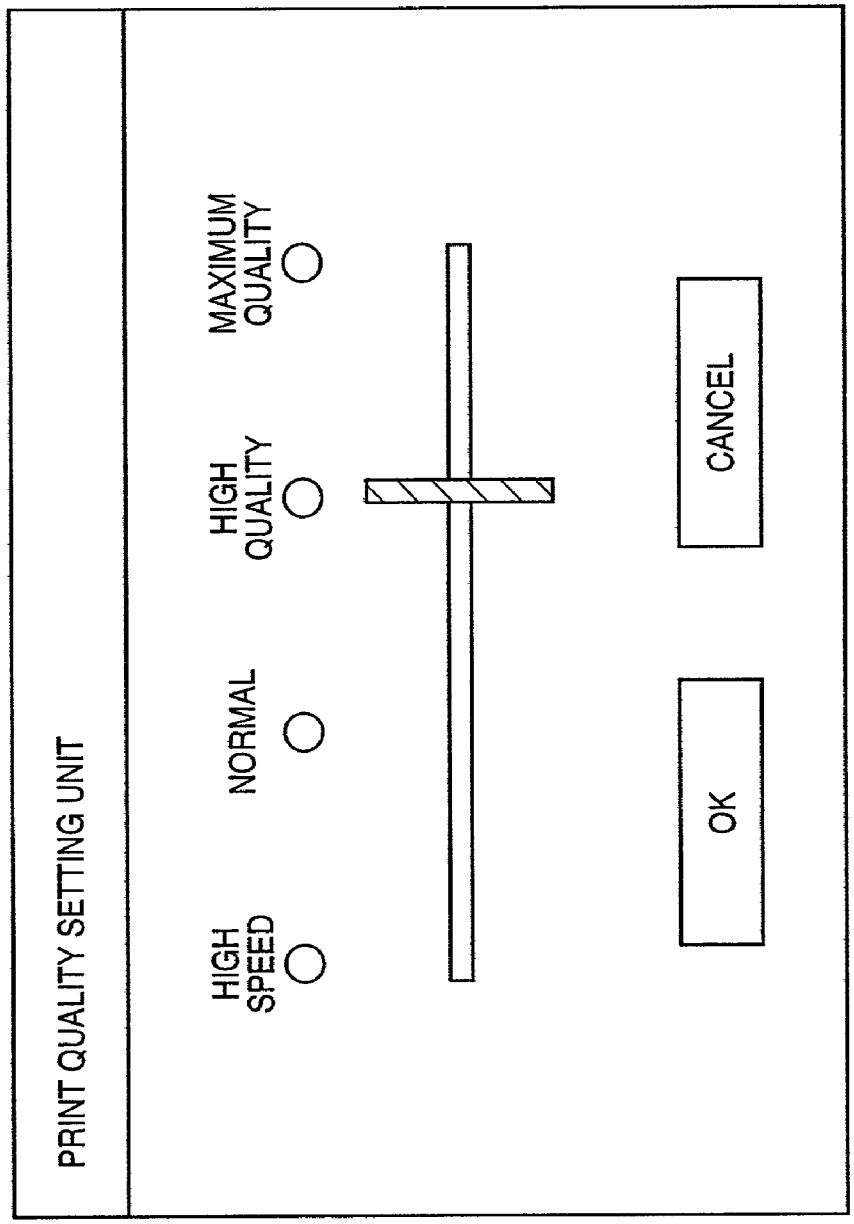
FIG. 28 is an example of GUI (Graphical User Interface) for setting print quality by a user.

In FIG. 27, the print quality setting unit 1131 inputs a parameter Quality for determination of error-correction parameter $(n_{D2}, k_{D2}, d_{D2})$ into the error-correction parameter determination unit 1132. FIG. 28 is an example of GUI (Graphical User Interface) for setting print quality by the user. The user operates the mouse 1038 and the keyboard 1037 by using the GUI screen image in FIG. 28 displayed on the display 1036 in FIG. 17, thereby sets the print quality. In FIG. 28, "maximum quality" is a mode where post-printing image quality can be increased to a maximum level, on the other hand, the print speed is the lowest. The print speed increases in the subsequent "high quality", "normal" and "high speed" sequentially, while the print quality is degraded. The print quality setting unit 1131 outputs one of the print qualities as the parameter Quality to the error-correction parameter determination unit 1132.

FIG. 29 is a table of list of error-correction parameter optimized for respective print modes. In FIG. 29, it is conceivable that in a case where the "maximum quality" is set and printing is performed, the error rate upon reading of additional information is the lowest. Accordingly, this mode is set such that the number of check bits is the smallest. Since it is conceivable that the error rate sequentially increases due to degradation of print quality in the subsequent modes "high quality", "normal" and "high speed", the amount of information to be added is reduced thereby the correction capability is increased. The error-correction parameter determination unit 1132 determines the parameter $(n_{D2}, k_{D2}, d_{D2})$ for error correction corresponding to the input parameter Quality, and inputs the parameter into the error-correction coding unit 1013.

That is, the feature of the fourth embodiment of the present invention is that the apparatus further comprises list holding means (secondary storage device 1055) for holding a list of error-correction parameters corresponding to plural print qualities, and that the error-correction parameter determination unit selects an error-correction parameter corresponding to a set print quality from the list. Further, the error-correction parameter has a maximum addable information amount for each print quality.

Next, an operation procedure of the image coding device according to the fourth embodiment will be described. The basic operation procedure from input of parameter to output of printed image 1133 is the same as the operation procedure of the image processing apparatus according to the third embodiment. Here an operation of the error-correction parameter determination unit 1132 which determines the error-correction parameter $(n_{D2}, k_{D2}, d_{D2})$ will be described.

Note that in the present embodiment, an optimum BCH parameter $(n_{D2}^m, k_{D2}^m, d_{D2}^m)$ is previously determined for each of m types of print qualities Q[m]. Then a list as shown in FIG. 29 is stored into the secondary storage device 1035 or the like in the control device 1030 for multiplexing or decoding.

Figure 30:
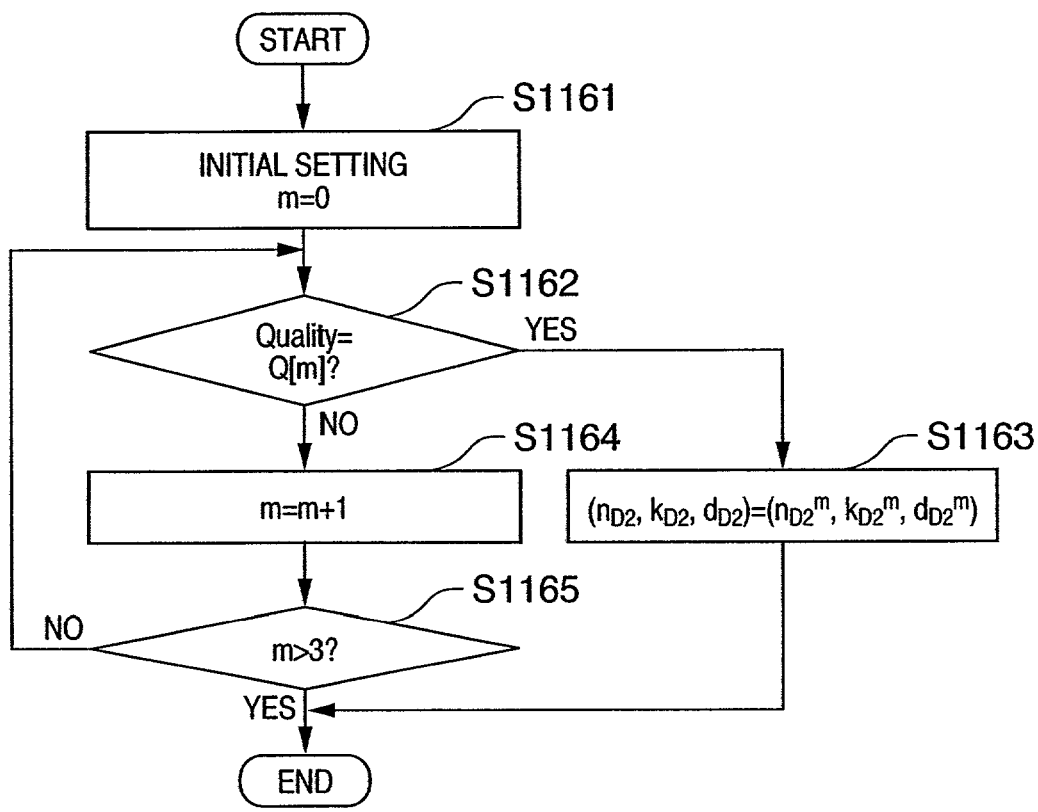
FIG. 30 is a flowchart showing an operation procedure of an error-correction parameter determination unit 1132 according to the fourth embodiment.

FIG. 30 is a flowchart showing an operation procedure of the error-correction parameter determination unit 1132 according to the fourth embodiment. First, in the error-correction parameter determination unit 1132, initial setting is performed, and m is set to 0 (step S1161). Next, it is determined whether or not the parameter Quality obtained by the print quality setting unit 1131 exists in correspondence with m=0 on the list (step S1162). As a result, if it is determined that the parameter Quality exists in correspondence with m=0 on the list (YES), the optimum parameter $(n_{D2}{}^m, k_{D2}{}^m, d_{D2}{}^m)$ is inputted into the error-correction coding unit 1013 (step S1163).

On the other hand, if the parameter Quality does not exist in correspondence with m=0 on the list (NO), m is incremented (m=m+1) (step S1164). Then it is determined whether or not m>3 holds. If it is determined that m>3 does not hold (NO), the process returns to step S1162, at which it is determined whether or not the parameter Quality corresponds to m on the list. On the other hand, if it is determined at step S1165 that m>3 holds (YES), the operation of the error-correction parameter determination unit 1131 ends. In this manner, the error-correction parameter determination unit 1132 determines the error-correction parameter.

The fourth embodiment is as described above. The modes indicating print qualities are not limited to the above-described four modes, but the number of modes may be greater or less than four. Further, in FIG. 29, the print quality is lowered from the "maximum quality" toward the "high speed" while the error-correction capability of error correcting code becomes higher, however, it may be arranged such that error correcting code having an optimum correction capability is used for each mode.

<Fifth Embodiment>

In the fifth embodiment, as a factor which influences the error rate upon reading of additional information, the characteristic of multiplexed image is taken into consideration. In the embodiment, the histogram of luminance value of the multiplexed image is generated. Regarding an image including a number of image areas of density higher/lower than a threshold value, it is determined that there is a high probability that the error rate rises upon reading, and a parameter with high error-correction capability is used.

Figure 31:
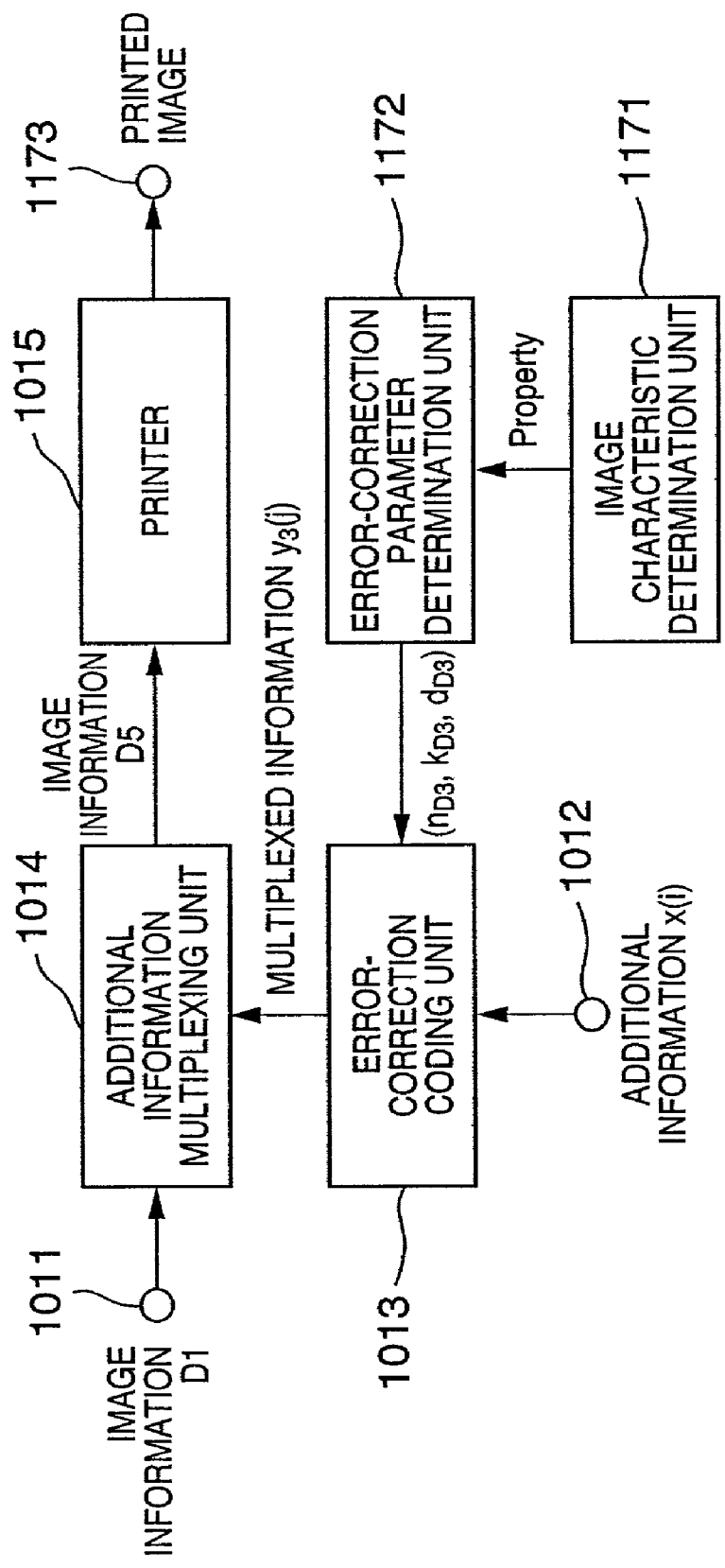
FIG. 31 is a block diagram showing the construction of the image processing apparatus according to a fifth embodiment of the present invention which embeds additional information in image information and performs printing.

FIG. 31 is a block diagram showing the construction of the image processing apparatus according to the fifth embodiment of the present invention which embeds additional information in image information and performs printing. In FIG. 31, the roles and operations of the input terminals 1011, 1013, the error-correction coding unit 1013, the additional information multiplexing unit 1014 and the printer 1015 are the same as those in FIG. 15 of the third embodiment and in FIG. 27 of the fourth embodiment. In FIG. 31, an image characteristic determination unit 1171 inputs a parameter Property for determination of error-correction parameter $(n_{D3}, k_{D3}, d_{D3})$ into an error-correction parameter determination unit 1172.

That is, the feature of the fifth embodiment of the present invention is that the image processing apparatus having multiplexing means (additional information multiplexing unit 1014) for embedding additional information in image information, and at least one print means (printer 1015) for print-outputting the image information where the additional information is embedded, comprises image characteristic evaluation amount calculation means (image characteristic determination unit 1171) for obtaining an image characteristic evaluation amount for evaluation of the characteristic of the image information, error-correction parameter determination means (error-correction parameter determination unit 1172) for determining an error-correction parameter in correspondence with the calculated image characteristic evaluation amount, and error-correction coding means (error-correction coding unit 1013) for generating multiplexed information where the additional information is error-correction encoded in correspondence with the determined error-correction parameter, and that the multiplexing means embeds the multiplexed information in the image information.

Figure 32:
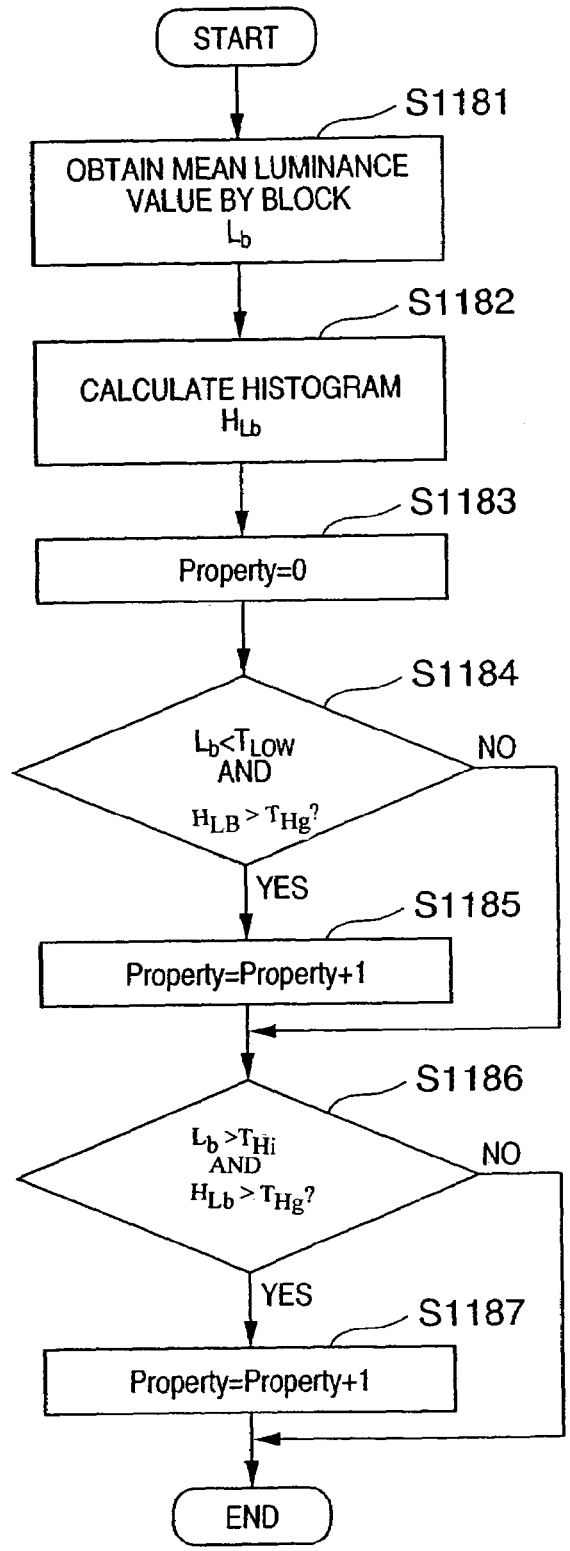
FIG. 32 is a flowchart showing an operation procedure of an image characteristic determination unit 1171.
Figure 33:
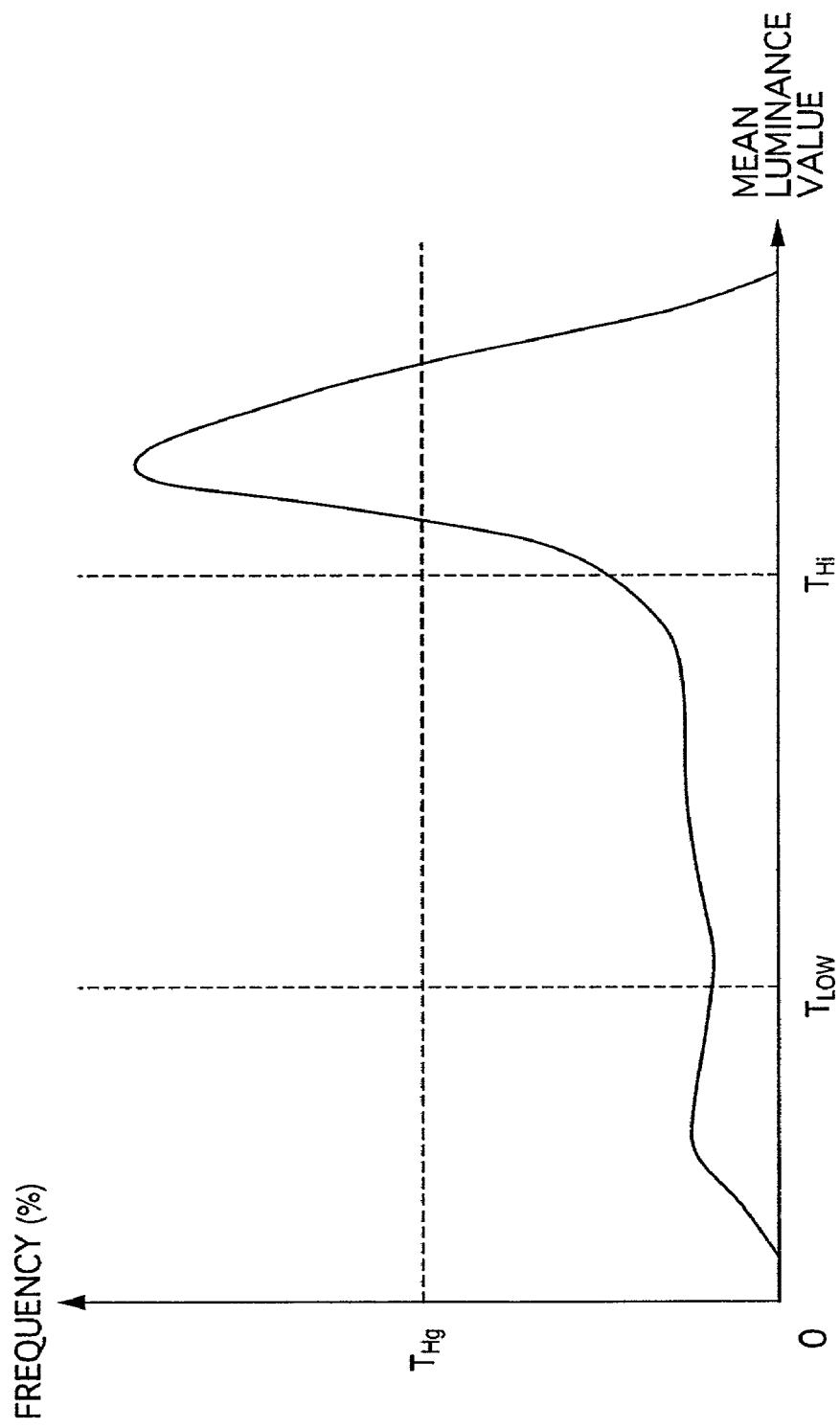
FIG. 33 is a line graph as an example of histogram of the entire image to be multiplexed.

FIG. 32 is a flowchart showing an operation procedure of the image characteristic determination unit 1171. In the image characteristic determination unit 1171, first, an image is divided into blocks in several pixel units, and a mean luminance value $L_b$ in each block is calculated (step S1181). Next, a histogram $H_{Lb}$ of the entire image to be multiplexed is calculated (step S1182) from the calculated means luminance value $L_b$. FIG. 33 is a line graph as an example of histogram of the entire image to be multiplexed. In FIG. 33, the horizontal axis represents the mean luminance value, and the vertical axis, the frequency. Note that the frequency is obtained by dividing the number of blocks having the same mean luminance value by the number of blocks of the entire image to be multiplexed, and is represented by percentage (%). FIG. 34 is a table of list of error-correction parameters in which the amount of addable information is reduced while correction capability is increased in accordance with increase in the parameter Property.

The feature of the fifth embodiment of the present invention is that the image characteristic evaluation amount calculation means has an image dividing unit that divides the image information into plural blocks, a mean luminance value calculation unit that calculates a mean luminance value of each block, a frequency distribution calculation unit that calculates the frequency distribution of the mean luminance value, and an image characteristic evaluation unit that calculates the image characteristic evaluation amount in correspondence with the frequency distribution.

In FIG. 32, the parameter Property is initialized (step S1183). Then it is determined whether or not the percentage of an area $H_{Lb}$ where the luminance value $L_b$ is less than a threshold value $T_{LOW}$ is greater than a threshold value $T_{Hg}$(%)(step S1184). As a result, if it is determined that the percentage of the area $H_{Lb}$ is greater than the threshold value $T_{Hg}$(%)(YES), the parameter Property is incremented (Property=Property+1) (step S1185).

(Property=Property+1) (step S1185). For example, in the case of histogram as shown in FIG. 33, the percentage of the area $H_{Lb}$ less than the threshold value $T_{LOW}$ is low, the parameter Property is incremented to 1.

On the other hand, if it is determined at step S1184 that the percentage of the area $H_{Lb}$ is not greater than the threshold value $T_{Hg}$(%) (NO), it is determined whether or not the percentage of the area $H_{Lb}$ where the luminance value $L_b$ is greater than a threshold value $T_{Hi}$ is greater than the threshold value $T_{Hg}$(%) (step S1186). As a result, if it is determined that the percentage of the area $H_{Lb}$ is greater than the threshold value $T_{Hg}$(%)(YES), the parameter Property is incremented (Property=Property+1)(step S1187). On the other hand, if it is determined at step S1186 that the percentage of the area $H_{Lb}$ is not greater than the threshold value $T_{Hg}$(%) (NO), the process ends. In this manner, in the present embodiment, the value of the parameter Property may be 0, 1 or 2.

That is, the feature of the fifth embodiment of the present invention is that the apparatus further comprises list holding means (secondary storage device 1035 or the like) for holding a list of error-correction parameters corresponding to plural image characteristic evaluation amounts, and that the error-correction parameter determination means selects an error-correction parameter corresponding to the calculated image characteristic evaluation amount. Further, the error-correction parameter has a maximum addable information amount for each image characteristic evaluation amount.

Figure 35:
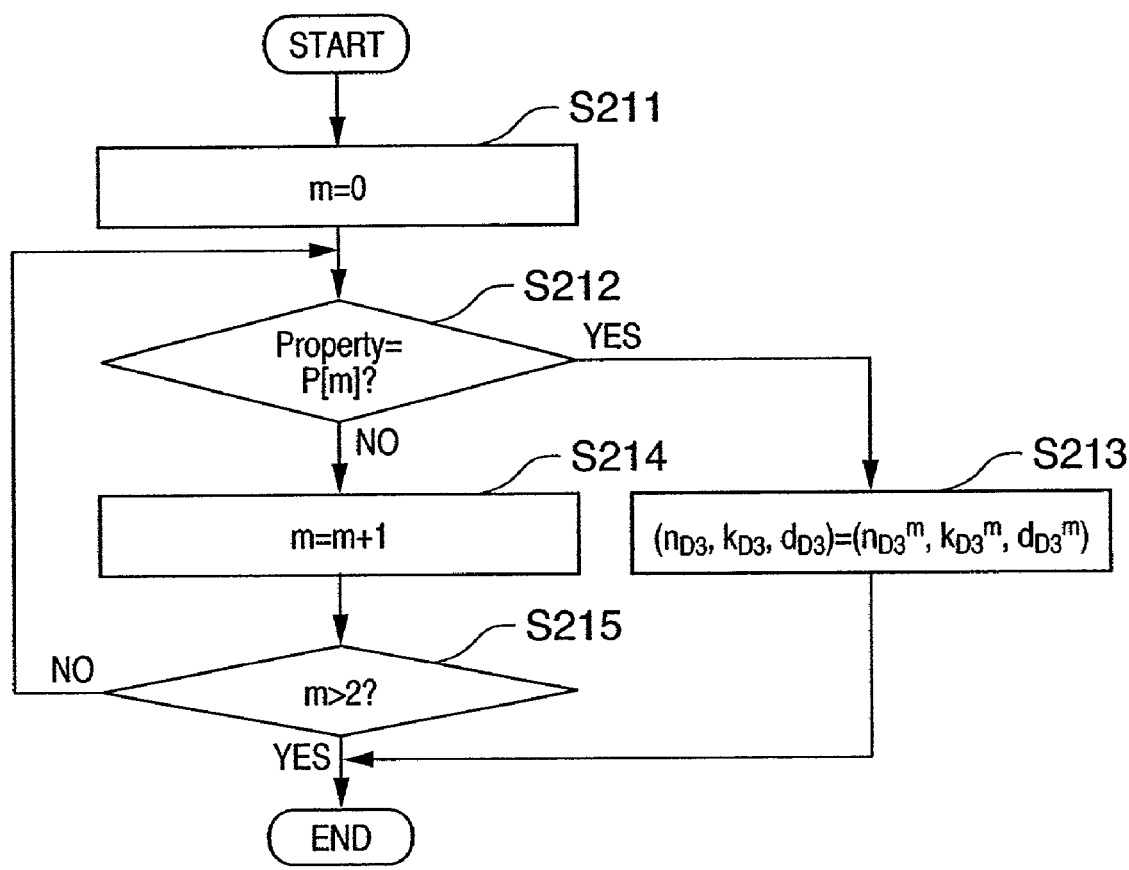
FIG. 35 is a flowchart showing an operation procedure of the error-correction parameter determination unit 1172 according to the fifth embodiment.

By the processing procedure in FIG. 32, the parameter Property is obtained at the image characteristic determination unit 1771, and the parameter Property is inputted into the error-correction parameter determination unit 1172. FIG. 35 is a flowchart showing an operation procedure of the error-correction parameter determination unit 1172 according to the fifth embodiment.

First, in the error-correction parameter determination unit 1172, initial setting is made to set the variable m to 0 (step S1211). Next, it is determined whether or not the parameter Property obtained by the image characteristic determination unit 1171 exists in correspondence with m=0 on the list in FIG. 34 (step S1212). As a result, if it is determined that the parameter Property exists in correspondence with m=0 on the list (YES), an optimum parameter $(n_{D3}{}^m, k_{D3}{}^m, d_{D3}{}^m)$ is inputted into the error-correction coding unit 1033 (step S1213).

On the other hand, if it is determined that the parameter Property does not exist in correspondence with m=0 on the list (NO), the parameter is incremented (m=m+1)(step S1214). Then it is determined whether or not m>2 holds (step S1215). If it is determined that m>2 does not hold (NO), the process returns to step S1212, at which it is determined whether or not the parameter Property corresponds to the variable m on the list. On the other hand, if it is determined at step S1215 that m>2 holds (YES), the operation of the error-correction parameter determination unit 1172 ends. In this manner, the error-correction parameter determination unit 1172 determines the error-correction parameter $(n_{D3}, k_{D3}, d_{D3})$.

The fifth embodiment is as described above. In the present embodiment, two types of luminance threshold values and one types of frequency threshold value are employed, however, the number of these threshold values may be increased or decreased.

Further, the parameter values in the respective lists are previously set in the system, however, the parameter values may be set by user's input or input from a remote place through a network.

The present invention can be applied to a system constituted by a plurality of devices (e.g., a host computer, an interface, a reader and a printer) or to an apparatus comprising a single device (e.g., a copy machine or a facsimile apparatus).

Further, the object of the present invention can be also achieved by providing a storage medium (or recording medium) storing software program code for performing the functions of the above-described embodiments to a system or an apparatus, reading the program code with a computer (e.g., CPU, MPU) of the system or apparatus from the storage medium, then executing the program. In this case, the program code read from the storage medium realizes the functions according to the embodiments, and the storage medium storing the program code constitutes the invention. Further, besides aforesaid functions according to the above-described embodiments are realized by executing the program code which is read by a computer, the present invention includes a case where an operating system (OS) or the like working on the computer performs a part or entire actual processing in accordance with designations of the program code and realizes functions according to the above embodiments.

Furthermore, the present invention also includes a case where, after the program code read from the storage medium is written in a function expansion card which is inserted into the computer or in a memory provided in a function expansion unit which is connected to the computer, a CPU or the like contained in the function expansion card or unit performs a part or entire actual processing in accordance with designations of the program code and realizes the functions of the above embodiment.

In a case where the present invention is applied to the aforesaid storage medium, the storage medium stores program code corresponding to the flowcharts described in the embodiments.

As described above, according to the present invention, the relation between the amount of addable information as additional information and the amount of check bits for error correction can be optimized.

As many apparently widely different embodiments of the present invention can be made without departing from the spirit and scope thereof, it is to be understood that the invention is not limited to the specific embodiments thereof except as defined in the appended claims.

What is claimed is:

1. An image processing apparatus which multiplexes additional information, different from image information, in the image information, comprising:

determination means for determining an intensity of error-correction in correspondence with print means printing the image information;

error-correction coding means for generating multiplexed information where the additional information is error-correction encoded by using the determined error-correction intensity;

multiplex means for multiplexing the additional information, which has been encoded with the error-correction intensity determined by said determination means, in the image information; and list holding means for holding a list of intensities of error-correction corresponding to plural print means, wherein said determination means selects an intensity of error-correction corresponding to the designated print means from the list.

2. The image processing apparatus according to claim 1, wherein each of the intensities in the list has a maximum addable information amount in each print means.

3. An image processing apparatus which multiplexes additional information, different from image information, in the image information, comprising:

print quality setting means for setting a print quality of print means, wherein said print means has at least a first print quality and a second print quality higher than the first print quality;

determination means for determining an intensity of error-correction in correspondence with the set print quality, wherein the intensity of error-correction for the second quality is lower than that of first quality;

error-correction coding means for generating multiplexed information wherein the additional information is error-correction encoded by using the determined intensity of error-correction; and multiplex means for multiplexing the additional information, which has been encoded with the error-correction intensity determined by said determination means, in the image information.

4. The image processing apparatus according to claim 3, further comprising list holding means for holding a list of intensities of error-correction corresponding to plural print qualities, wherein said determination means selects an intensity of error-correction corresponding to the set print quality from the list.

5. The image processing apparatus according to claim 4, wherein each of the intensities in the list has a maximum addable information amount for each print quality.

6. An image processing apparatus which multiplexes additional information, different from image information, in the image information, comprising:
   image feature amount calculation means for calculating a feature amount of the image information and determining a class of the image information;
   determination means for determining an intensity of error-correction in correspondence with the determined class;
   error-correction coding means for generating multiplexed information wherein the additional information is error-correction encoded in correspondence with the determined intensity of error-correction; and
   multiplex means for multiplexing the additional information, which has been encoded with the error-correction intensity determined by said determination means, in the image information.

7. The image processing apparatus according to claim 6, further comprising list holding means for holding a list of intensities of error-correction corresponding to plural image feature amounts,
   wherein said determination means selects an intensity of error-correction corresponding to the calculated image feature amount from the list.

8. The image processing apparatus according to claim 7, wherein each of intensities in the list has a maximum addable information amount for each image feature amount.

9. The image processing apparatus according to claim 6, wherein said image feature amount calculation means has:
   an image dividing unit adapted to divide the image information into plural blocks;
   a mean luminance value calculation adapted to calculate a mean luminance value in each block;
   a frequency distribution calculation unit adapted to calculate a frequency distribution of the mean luminance value; and
   an image feature unit adapted to calculate an image feature amount in correspondence with the frequency distribution.

10. The image processing apparatus according to claim 6, wherein said error-correction coding means uses BCH code.

11. An image processing method for an image processing apparatus which multiplexes additional information, different from image information, in the image information, said method comprising:
    a determination step, of determining an intensity of error-correction in correspondence with print means printing the image information;
    an error-correction coding step, of generating multiplexed information wherein the additional information is error-correction encoded by using the determined error-correction intensity; and
    a multiplexing step, of multiplexing the additional information, which has been encoded with the error-correction intensity determined in said determination step, in said image information,
    wherein said determination step includes selecting an error-correction intensity corresponding to the designated printing means from a list of intensities of error-correction corresponding to plural printing means.

12. The image processing method according to claim 11, wherein each of the intensities in the list has a maximum addable information amount in each printing means.

13. An image processing method for an image processing apparatus which multiplexes additional information, different from image information, in the image information, said method comprising:
    a print quality setting step, of setting a print quality of printing means, wherein said print means has at least first print quality and second print quality higher than the first print quality;
    a determination step, of determining an intensity of error-correction in correspondence with the set print quality, wherein the intensity of error-correction for the second quality is lower than that of first quality;
    an error-correction coding step, of generating multiplexed information wherein the additional information is error-correction encoded by using the determined intensity of error-correction; and
    a multiplexing step, of multiplexing the additional information, which has been encoded with the error-correction intensity determined in said determination step, in the image information.

14. The image processing method according to claim 13, wherein said determination step includes selecting an intensity of error-correction corresponding to the designated print quality from a list of intensities of error-correction corresponding to plural print qualities.

15. The image processing method according to claim 14, wherein each of the intensities in the list has a maximum addable information amount for each print quality.

16. An image processing method for an image processing apparatus which multiplexes additional information, different from the image information, in the image information, said method comprising:
    an image feature amount calculation step, of calculating a feature amount of the image information and determining a class of the image information;
    a determination step, of determining an intensity of error-correction in correspondence with the determined class;
    an error-correction coding step, of generating multiplexed information wherein the additional information is error-correction encoded in correspondence with the determined intensity of error-correction; and
    a multiplexing step, of multiplexing the additional information, which has been encoded with the error-correction intensity determined in said determination step, in the image information.

17. The image processing method according to claim 16, wherein said determination step includes selecting an intensity of error-correction corresponding to the determined class from a list of intensities of error-correction corresponding to plural image feature amounts.

18. The image processing method according to claim 17, wherein each of intensities in the list has a maximum addable information amount for each image feature amount.

19. The image processing method according to claim 16, wherein said image feature amount calculation step includes the steps of:
    dividing the image information into plural blocks;
    calculating a mean luminance value in each block;
    calculating a frequency distribution of the mean luminance value; and
    calculating the image feature amount in correspondence with the frequency distribution.

20. The image processing method according to claim 16, wherein said error-correction coding step includes using BCH code upon error-correction coding.

21. A computer program stored in a computer readable medium for controlling an image processing apparatus which multiplexes additional information, different from image information, in the image information, comprising:

program code of a determination process for determining an intensity of error-correction in correspondence with print means printing the image information;

program code of an error-correction coding process for generating multiplexed information, wherein the additional information is error-correction encoded by using the determined error-correction intensity; and program code of a multiplexing process for multiplexing the additional information, which has been encoded with the error-correction intensity determined in said determination process, in the image information, wherein said determination process includes selecting an error-correction intensity corresponding to the designated printing means from a list of intensities of error-correction corresponding to plural printing means.

* * * * *

UNITED STATES PATENT AND TRADEMARK OFFICE
CERTIFICATE OF CORRECTION

PATENT NO. : 7,116,826 B2
APPLICATION NO. : 10/170358
DATED : October 3, 2006
INVENTOR(S) : Kiyoshi Umeda et al.

It is certified that error appears in the above-identified patent and that said Letters Patent is hereby corrected as shown below:

COLUMN 2

Line 9, "e.g." should read --e.g.,--.

COLUMN 4

Line 46, "preset" should read --present--.

COLUMN 6

Line 3, "code" should read --codes--.

COLUMN 12

Line 25, "$Y_1'(j)$" should read --$y_1'(j)$--.

COLUMN 13

Line 43, "correction-correction" should read --error-correction--.

COLUMN 18

Line 42-45, "(Property=Property+1) (step S1185). For example, in the case of histogram as shown in FIG. 33, the percentage of the area $H_{Lb}$ less than the threshold value $T_{LOW}$ is low, the parameter Property is incremented to 1." should be deleted.

UNITED STATES PATENT AND TRADEMARK OFFICE
CERTIFICATE OF CORRECTION

| | |
|---|---|
| PATENT NO. | : 7,116,826 B2 |
| APPLICATION NO. | : 10/170358 |
| DATED | : October 3, 2006 |
| INVENTOR(S) | : Kiyoshi Umeda et al. |

It is certified that error appears in the above-identified patent and that said Letters Patent is hereby corrected as shown below:

COLUMN 19

Line 36, "types" should read --type--.

Signed and Sealed this

Nineteenth Day of June, 2007

JON W. DUDAS
*Director of the United States Patent and Trademark Office*